United States Patent
Kakutani

(10) Patent No.: US 6,543,870 B1
(45) Date of Patent: Apr. 8, 2003

(54) IMAGE PROCESSING APPARATUS AND PRINTING APPARATUS

(75) Inventor: Toshiaki Kakutani, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 101 days.

(21) Appl. No.: 09/713,200

(22) Filed: Nov. 16, 2000

(30) Foreign Application Priority Data

Nov. 17, 1999  (JP) .......................................... 11-327437

(51) Int. Cl.$^7$ ................................................ B41J 2/205
(52) U.S. Cl. ............................ 347/15; 347/43; 358/534
(58) Field of Search ..................... 347/15, 43; 358/501, 358/504, 527, 533, 521, 534, 463, 298

(56) References Cited

U.S. PATENT DOCUMENTS

| | | | | |
|---|---|---|---|---|
| 5,355,421 A | * | 10/1994 | Koyama ...................... | 382/54 |
| 5,463,720 A | * | 10/1995 | Granger ...................... | 358/456 |
| 5,606,432 A | * | 2/1997 | Ohtsuka et al. ............. | 358/527 |
| 6,124,844 A | * | 9/2000 | Ilbery ......................... | 358/456 |
| 6,169,608 B1 | * | 1/2001 | Yoshida ...................... | 358/1.9 |
| 6,285,464 B1 | * | 9/2001 | Katayama .................. | 358/298 |

FOREIGN PATENT DOCUMENTS

| | | |
|---|---|---|
| EP | 0 622 950 | 11/1994 |
| EP | 0 808 055 | 11/1997 |
| EP | 0 820 187 | 1/1998 |
| WO | WO 96/32812 | 10/1996 |

* cited by examiner

Primary Examiner—Lamson Nguyen
(74) Attorney, Agent, or Firm—Oblon, Spivak, McClelland, Maier & Neustadt, P.C.

(57) ABSTRACT

The technique of the present invention improves the picture quality of resulting prints, which are subjected to special effects like halftoning, in an ink jet printer. With regard to two specific colors, light cyan and light magenta, among six colors, cyan, light cyan, magenta, light magenta, yellow, and black, the technique corrects image data having tone values in a predetermined range with regard to each color with noise data simulating a halftone dot pattern, and carries out a dot distributed-type halftoning process, for example, according to the error diffusion method to print an image. Namely the technique provides image data corresponding to a resulting image subjected to special effects like halftoning, and carries out the halftoning process for the image data to implement printing. This arrangement attains the high-quality halftone printing.

13 Claims, 13 Drawing Sheets

Fig.9

| 0 | 2 | 10 | 29 | 37 | 34 | 30 | | |
|---|---|---|---|---|---|---|---|---|
| 1 | 5 | 16 | 33 | 41 | 42 | 38 | 28 | |
| 9 | 13 | 21 | 39 | 43 | 44 | 36 | 20 | 8 |
| 30 | 23 | 27 | 31 | 35 | 40 | 32 | 11 | 3 | 0 |
| | 28 | 18 | 12 | 19 | 26 | 25 | 15 | 6 | 1 |
| | | 8 | 4 | 7 | 14 | 22 | 24 | 17 | 9 |
| | | 3 | 0 | 2 | 10 | 29 | 37 | 34 | 30 |
| | | | 1 | 5 | 16 | 33 | 41 | 42 | 38 |
| | | | | 13 | 21 | 39 | 43 | 44 | 36 |
| | | | | | 27 | 31 | 35 | 40 | 32 |

Fig.10

| 4 | 8 | 20 | 36 | 44 | 43 | | | |
|---|---|---|---|---|---|---|---|---|
| 0 | 3 | 11 | 32 | 40 | 35 | 31 | | |
| 1 | 6 | 15 | 25 | 26 | 19 | 12 | 18 | |
| 9 | 17 | 24 | 22 | 14 | 7 | 4 | 8 | 20 |
| 30 | 34 | 37 | 29 | 10 | 2 | 0 | 3 | 11 | 32 |
| 38 | 42 | 41 | 33 | 16 | 5 | 1 | 6 | 15 | 25 |
| 36 | 44 | 43 | 39 | 21 | 13 | 9 | 17 | 24 | 22 |
| | 40 | 35 | 31 | 27 | 23 | 30 | 34 | 37 | 29 |
| | | 26 | 19 | 12 | 18 | 28 | 38 | 42 | 41 | 33 |
| | | | 4 | 8 | 20 | 36 | 44 | 43 | 39 |

LOWER TONE

HIGHER TONE

IMAGE PROCESSING APPARATUS AND PRINTING APPARATUS

BACKGROUND OF THE INVENTION

1. Field of the Invention

The present invention relates to an image processing apparatus that carries out halftoning of multi-tone image data and a printing apparatus that creates dots according to halftone data obtained as a result of the halftoning process and thereby prints an image.

2. Description of the Related Art

Ink jet printers have widely been used as the output device of images processed by the computer. The ink jet printer creates dots on a printing medium with ink ejected from a plurality of nozzles formed on a print head, so as to record an image. The ink jet printer is generally capable of expressing only two tones, that is, the dot-on state and the dot-off state, with regard to each pixel. Image processing generally called the halftoning process is accordingly required, prior to printing an image. The halftoning process enables the multiple tones of original image data to be expressed by a distribution of dots. The ink jet printer is able to print images processed by the computer without the plate making process and thus has great facility.

In the ink jet printer, some effort is made to lower the visual conspicuousness of dots, in order to improve the granularity of the resulting image. The halftoning process adopted in the ink jet printer thus prevents local concentration of dots and attains the good dispersibility of dots. The dithering method using a discrete dither matrix like a Beiyer matrix is the known method to attain such halftoning process. The dithering method determines the dot on-off state, based on comparison between the tone values of the respective pixels and threshold values stored in a preset dither matrix.

The screen printing technique that uses a plate provided for each color is generally applied to print a large quantity of images. In the screen printing, the halftoning process is used for tone expression. The halftoning technique varies the dot percent to express each tone value. FIG. 17 shows an example of tone expression by the halftoning technique. In this example, the tone level is varied in three stages. The upper-most figure corresponds to the lowest tone level, and the tone level is heightened towards the bottom. In the area of low tone, dots having a small dot percent are used for printing. With an increase in tone value and an increase in density to be expressed, dots having the greater dot percent are used for printing.

The screen printing is a suitable technique for mass printing but takes a high cost for plate making. With a view to reducing the cost required for plate making, the ink jet printer may be used for prepress. The prepress here means the trial printing before the actual plate making to allow the operator to check the printed image. The prepress using the ink jet printer advantageously reduces the cost required for plate making.

When the ink jet printer is used for prepress in the screen printing, it is desirable that the picture quality of the printed image by the ink jet printer is close to the picture quality in the screen printing. For this purpose, the halftoning process for the prepress adopts the dithering method using a halftone dot-simulating dither matrix (hereinafter referred to as the halftoning dither). As described previously, the halftoning process in the ink jet printer is generally carried out to ensure the sufficient dispersibility of dots. The dither matrix used in the dot distributed-type halftoning process is set to make the pixels with the high probability of dot creation, that is, the pixels having lower threshold values, appear in a discrete manner in the matrix. In the halftoning dither method, on the other hand, the dither matrix used for the halftoning process is set to make the pixels having lower threshold values locally concentrated and thereby create dots according to a halftone-dot simulating pattern.

The halftoning process using the halftoning dither may, however, extremely lower the picture quality of resulting images due to various factors discussed below. FIG. 18A and FIG. 18B show the state of dots formed by an ink jet printer. FIG. 18A shows the state of dots created in the case of applying the halftoning dither, and FIG. 18B shows the state of dots created in the case of applying the discrete dither. In this example, a large matrix used corresponds to an area CE including a total of 100 pixels (10 pixels in length by 10 pixels in width). The tone level is varied in three stages, where the left part of the area CE expresses image data of high tones and the right part expresses image data of low tones. Each small matrix represents a pixel, and each closed circle represents a dot. The discrete dither gives dots in a distributed manner, whereas the halftoning dither gives local concentration of dots. I the case of the halftoning dither, the resolution is lowered by the local concentration of dots.

The reduced area CE and the shortened pitch of halftone dots can prevent the decrease in resolution due to the above reasons. This arrangement, however, narrows the expressible tone range. When the area CE includes 100 pixels as in the case of FIG. 18A and FIG. 18B, the dot percent may be varied in 100 stages at most. The reduced area CE decreases the number of stages of varying the dot percent, thus narrowing the expressible tone range. The halftoning dither method thus can not attain printing of the appropriate picture quality as the prepress with the sufficient resolution and expressible tone range.

Another problem of the halftoning dither method is the possible deterioration of the picture quality due to the interference of the frequency of halftone dot creation with various frequencies intrinsic to the ink jet printer, for example, the frequency of main scan and the frequency of sub-scan. The ink jet printer generally has a large number of nozzles for ink ejection, and there is a variation in ink ejection characteristics among the respective nozzles. There may be a feeding error in the course of sub-scan. In the ink jet printer, the misalignment of dots due to the varying ink ejection characteristics and the feeding error in the course of sub-scan periodically varies in an image.

The halftoning dither technique gives local concentration of dots as shown in FIGS. 17 and 18. The local concentration of dots appear at the frequency corresponding to the magnitude of the halftone area CE. In some cases, the frequency of causing the local concentration of dots is close to the frequency of significant misalignment of dots. The closed frequencies emphasize the misalignment of dots and cause periodical unevenness of density, thus deteriorating the picture quality of the resulting image.

Each dot blots and expands over the pixel interval on the printing medium. In the distributed dot creation technique, the dot recording rate that is significantly lower than 100% causes the whole surface of the printing medium to be covered with ink in a substantially homogeneous manner. The halftoning dither technique, on the other hand, forms local concentration of dots. Regardless of some blotting, it is difficult to completely cover the whole surface of the printing medium with ink at the dot recording rate that is not very close to 100%. As in the example of the high tone area shown in FIG. 17, the halftoning dither technique may result in dropping out. The printing medium generally has a restriction in absorbable quantity of ink (hereinafter referred to as the duty restriction). Some printing media in specific print modes reach the duty restriction even at the dot recording rate that is significant lower than 100%. Especially in the case of recording a plurality of different color inks in an overlapping manner, there is a severe restriction in quantity of ink for each color. In such cases, the prior art halftoning dither method leaves some undesirable drop-outs to deteriorate the picture quality and moreover does not attain the sufficient density.

Because of the problems discussed above, the halftoning dither does not attain the picture quality in the screen printing, and is thus not suitably applicable for prepress. These problems are found not only in the ink jet printers but in other printing apparatuses that print an image with dots. The essential part of these problems is ascribed to the halftoning process using the halftoning dither, and is thus common to any halftoning processes that create dots according to a diversity of patterns other than the halftone dot-simulating pattern.

SUMMARY OF THE INVENTION

The object of the present invention is thus to provide a technique that carries out the halftoning process using a predetermined pattern and improves the picture quality of resulting image based on the results of the halftoning process.

At least part of the above and the other related objects is attained by an image processing apparatus that generates halftone data, which specifies a dot creating state in each pixel, from image data having tone values in a predetermined range. The image processing apparatus includes: an input unit that inputs the image data; and a halftoning unit that carries out a dot distributed-type halftoning process to generate the halftone data. The halftoning unit has: a pattern storage unit that stores noise data according to a predetermined pattern, which includes local concentration of dots; and a reflection unit that causes the noise data stored in the predetermined pattern to be reflected on the halftoning process.

The reflection of noise data here means that at least part of the data used in the course of the halftoning process is corrected with the noise data. One applicable procedure adds noise data to the processed data. The object of the reflection of noise data may be selected according to the requirements.

For example, the noise data may be reflected on the image data.

When the halftoning unit carries out the halftoning process, based on comparison between the image data and predetermined threshold value data, the reflection unit causes the noise data to be reflected on the threshold value data.

The image processing apparatus of the present invention uses the noise data including the local concentration of dots in combination with the dot distributed-type halftoning process. Reflection of the noise data according to the predetermined pattern varies the probability of dot creation, thus attaining the expression according to the predetermined pattern. The dot distributed-type halftoning process increases dots with an increase in tone value while ensuring a sufficient dispersibility. The dispersibility of dots is one factor of improving the picture quality in the expression of an image with dots. The image processing apparatus of the above arrangement ensures the sufficient dispersibility of dots in the expression according to the predetermined pattern and thereby enhances the picture quality of the resulting image by the halftoning process.

The functions of the present invention are discussed below, based on the comparison between the prior art halftoning dither technique and the arrangement of the present invention that applies halftone noise data for the predetermined pattern and adds the noise data to the image data. The halftoning dither technique carries out halftoning of image data using a halftone dot-simulating dither matrix as described previously. This prior art technique performs the halftoning without any correction of the image data itself. This corresponds to the halftoning process for tone expression with the dot percent with regard to the area CE shown in FIGS. 17 and 18 set as the pixel unit. This halftoning process may result in deterioration of the resolution and the expressible tone range and cause problems like occurrence of the unevenness of density due to the periodical appearance of concentrated dots.

In the arrangement of the present invention, addition of the noise data to image data is equivalent to varying the image data itself according to the halftone dot-simulating pattern. This is not the simple dot, but a halftone dot with varying density, where the density gradually decreases from the center of the halftone dot toward the periphery. The technique of the present invention provides the image data following the halftone dot-simulating pattern of such characteristics and then carries out the dot distributed-type halftoning process. The combination of the dot distributed-type halftoning process with the image data following the halftone dot-simulating pattern significantly relieves the problems found in the prior art halftoning dither method and attains a high-quality image simulating halftone dots.

In the above description, the noise data are added to the image data. In the dot distributed-type halftoning process that determines the dot creating state based on the comparison between the image data and the predetermined threshold value, reflection of noise data on the image data is relatively equivalent to reflection of the noise data having the inverted sign on the threshold value. In the technique of the present invention, the noise data may thus be reflected on the threshold value. Another possible procedure makes the noise data reflected on both the image data and the threshold value.

The error diffusion method and the dithering method are applicable techniques to determine the dot creating state in each pixel based on comparison between the image data and a predetermined threshold value. The present invention may use either one of these techniques. The halftoning process here includes the binarization process that determines the dot on-off state in each pixel and the multi-valuing process that determines the dot creating state expressible by three or more different values in each pixel.

The error diffusion method diffuses a quantization error made by each processed pixel to peripheral unprocessed pixels with predetermined weights, makes the total of diffused error divisions in a pixel of interest reflected on image data with regard to the pixel of interest, and determines the dot creating state in the pixel of interest based on comparison between the processed image data and a predetermined threshold value. The quantization error made by the pixel of interest according to the result of the determination of the dot creating state is further diffused to peripheral unprocessed pixels. The error diffusion method minimizes the mean local quantization error and carries out the halftoning process to ensure the excellent picture quality of the resulting image and the sufficient dispersibility of dots. The image processing apparatus that adopts the error diffusion method can thus implement the halftoning process to ensure the high picture quality of the resulting image. Reflection of noise data on the image data in the error diffusion method causes the noise data to be included in the calculation and diffusion of errors. Reflection of noise data on the threshold value, on the other hand, causes the noise data to have no effects on the calculation and diffusion of errors. Either of the procedures of reflection may be adopted in the arrangement of the present invention. The former procedure of reflection causes the effects of the noise data to be relatively remarkable.

The dithering method determines the dot creating state in each pixel based on the comparison between the image data and a threshold value stored in a preset dither matrix. The dither matrix used here may be any of those ensuring the sufficient dispersibility of dots, for example, the Beiyer type. In such a dither matrix, consecutive threshold values appear in a discrete manner. The image processing apparatus that adopts the dithering method can implement the halftoning process at a high speed. In the dithering method, noise data may be reflected on either the image data or the threshold value. These two procedures of reflection give the equivalent results in the case of the dithering method.

The halftoning process by the dithering method may use a specific matrix obtained by previously adding noises of a predetermined pattern to a dither matrix ensuring the sufficient dispersibility of dots. This procedure corresponds to one application of the reflection of the noise data on the threshold value. This arrangement omits the step of reflecting the noise data on either the image data or the threshold value in the halftoning process and thus enhances the processing speed.

The above example applies the halftone noise data for the predetermined pattern. The predetermined pattern is, however, not restricted to the pattern of halftone dots. The present invention may apply any pattern that includes local concentration of dots, in order to improve the picture quality of the resulting image by the halftoning process. The halftone dot-simulating pattern is only one of the various applicable patterns. The halftone dot-simulating pattern is, however, highly effective since it is applicable for the prepress in the screen printing that utilizes the apparatus of printing or displaying images with dots. The variety of other patterns may be utilized as special effects.

The image processing apparatus of the present invention has other advantages discussed below. In the image processing apparatus of the present invention, the noises of the predetermined pattern have substantially no effects on the technique of the halftoning process. The effects of addition of the predetermined pattern can thus be emphasized or relieved in a flexible manner by simply adjusting the magnitude of the noise data.

A variety of advantages discussed below are expected in the case where the halftone data generated by the image processing apparatus of the present invention are printed with an ink jet printer. Creation of dots within the duty restriction, which depends upon the printing medium, is required to ensure the sufficient picture quality of the resulting image by the ink jet printer. The image processing apparatus of the present invention applies the dot distributed-type halftoning process and thus prevents extreme concentration of dots. The dot distributed-type halftoning process is equivalent to the halftoning process generally used for the printing operations in the ink jet printer. A variety of known techniques are thereby applicable to record dots within the duty restriction. The image processing apparatus of the present invention thus advantageously keep the duty restriction in the application for the ink jet printer.

As described previously as the drawback of the prior art technique, in the ink jet printer, the interference of the frequency of local concentration of dots with the frequency of misalignment of dots created by the respective nozzles causes periodical unevenness of density. The unevenness of density is especially conspicuous in the halftoning dither. The image processing apparatus of the present invention, on the other hand, adopts the dot distributed-type halftoning process and ensures the sufficient dispersibility of dots, thus reducing the unevenness of density due to the interference. The ink jet printer that receives the halftone data processed by the image processing apparatus of the present invention can attain the high quality printing.

In the image processing apparatus of the present invention, the image data may be monochromatic data or color data.

When the image data is multi-color image data, the reflection unit causes the predetermined pattern, which is a halftone dot-simulating pattern having different screen angles between at least part of colors, to be reflected on the halftoning process.

In this case, it is preferable that the at least part of colors are cyan and magenta.

As described previously, the interference of the frequency of local concentration of dots with the frequency of misalignment of dots created by the printing apparatus deteriorates the picture quality of the resulting image. Application of the pattern having an identical screen angle for all the colors results in the significant appearance of such interferences. The preferable arrangement of the present invention discussed above applies the predetermined pattern having different screen angles between at least part of colors, in order to relieve the potential effects due to the interference. As is known in the general screen printing, formation of halftone dots with different screen angles adopted for the respective colors enables the tone expression closer to that in the screen printing. Different screen angles may be set for all the colors, or alternatively a common screen angle may be set for part of the colors. Setting the different screen angles for cyan and magenta, which have relatively high visual recognizability, effectively reduces the interference and enables the tone expression similar to that in the screen printing.

In accordance with one preferable application of the image processing apparatus of the present invention, when the dots include a plurality of different types of dots having at least one of different hues and different reflective densities of creation, the halftoning unit carries out the halftoning process for each type of dots and causes the noise data to be reflected on the halftoning process with regard to at least part of the dots.

The dots having different reflective densities represent dots created by inks of different densities or dots having different quantities of ink.

The noise data include local concentration of dots. Some degree of dispersibility of dots is desirable to improve the picture quality in the apparatus of printing or displaying images with dots. The arrangement of reflecting the noise data with regard to the part of the dots ensures the sufficient dispersibility of the dots without reflection of the noise data, thus enhancing the total picture quality of the resulting image. Reducing the number of the types of dots created in a locally concentrated manner makes easier to keep the duty restriction.

Reducing the number of the types of dots with addition of the noise pattern effectively prevents the deterioration of the picture quality due to the interference of the frequency of local concentration of dots with the various frequencies intrinsic to the printing apparatus. This arrangement further relieves the labor of adding the noise pattern and reduces the number of the noise patterns to be provided.

In the arrangement of causing the noise data to be reflected on the part of the dots, when the dots include a plurality of different types of dots having an identical hue but different reflective densities of creation, the part of the dots excludes at least a specific type of dots having the identical hue and a higher reflective density among the plurality of different types of dots.

For example, in the case of dots having different quantities of ink, the noise data may be reflected on the dots having the smaller quantity of ink. In the case of dots created with inks of different densities, the noise data may be reflected on the dots created with ink of the lower density. The similar technique is adopted in the case of creating a plurality of different types of dots by combining different quantities of ink and different densities of inks.

It is not necessary that the above condition is fulfilled for all the hues. For example, in the case where the two colors, cyan and magenta, respectively provide a plurality of different dots having different reflective densities, the noise data may be reflected on only the dots having the lower reflective density with regard to both the colors or with regard to only one of the colors.

Addition of the noise data to the dots having the higher reflective density results in forming the predetermined pattern in a high density area. The pattern formed in such a high density area is visually rather inconspicuous, so that the addition of the predetermined pattern does not have significant effects on the tone expression. Addition of the noise data to the other dots, that is, the dots used in a low tone area or an intermediate tone area, on the other hand, forms the predetermined pattern that is visually conspicuous. This ensures the significant effects.

In the arrangement of causing the noise data to be reflected on the part of the dots, the noise data may be reflected on the dots having hues excluding at least yellow. For example, the dots, which are the object of reflection, may have the hues of cyan and magenta. Black dots may also be the object of reflection of the noise data. The color of yellow is visually rather inconspicuous, and no significant effects are expected by addition of the noise data to the yellow dots. The arrangement of omitting the reflection on the yellow dots, on the other hand, advantageously shortens the total time required for the processing and reduces the possible interference.

The principle of the present invention may be attained by a printing apparatus having a main part identical with that of the image processing apparatus discussed above.

The present invention is accordingly directed to a printing apparatus that creates dots to print an image on a printing medium. The printing apparatus includes: an input unit that inputs image data having tone values in a predetermined range; a halftoning unit that carries out a dot distributed-type halftoning process to generate halftone data, which specifies a dot creating state in each pixel; and a dot creation unit that creates dots on the printing medium based on the halftone data. The halftoning unit has: a pattern storage unit that stores noise data according to a predetermined pattern, which includes local concentration of dots; and a reflection unit that causes the noise data stored in the predetermined pattern to be reflected on the halftoning process.

The printing apparatus of the present invention prints an image according to the halftone data generated by the series of the processing, which is similar to the processing discussed previously with regard to the image processing apparatus. This arrangement ensures the high-quality printing with the additional effects of the predetermined pattern on the tone expression. The variety of additional factors described previously with regard to the image processing apparatus are also applicable to this printing apparatus. Any of various printing apparatuses that print an image with dots may be applied for the printing apparatus of the present invention. The ink ejection-type printing apparatus that ejects ink to create dots is especially suitable for the technique of ensuring the sufficient dispersibility of dots and thereby attaining the high-quality printing.

The present invention is further directed to an image processing method that generates halftone data, which specifies a dot creating state in each pixel, from image data having tone values in a predetermined range. The method includes the steps of: (a) inputting the image data; and (b) carrying out a dot distributed-type halftoning process, on which noise data preset according to a predetermined pattern including local concentration of dots are reflected, so as to generate the halftone data.

Because of the same effects as those discussed previously in the image processing apparatus, the image processing method of the present invention improves the picture quality of a resulting image that includes dots created according to a predetermined pattern and is subjected to the halftoning process. The variety of additional factors described previously with regard to the image processing apparatus are also applicable to this image processing method. The present invention is attained by a printing method, as well as the image processing method.

The present invention is also directed to a recording medium in which a specific program is recorded in a computer readable manner, wherein the specific program generates halftone data, which specifies a dot creating state in each pixel, from image data having tone values in a predetermined range. The specific program includes noise data preset according to a predetermined pattern including local concentration of dots. The specific program causes a computer to attain the functions of: causing the noise data to be reflected at least either one of input image data and a predetermined threshold value; and carrying out a dot distributed-type halftoning process to generate the halftone data from the image data and the threshold value after the reflection.

The computer executes the specific program recorded in the recording medium, so as to implement the image processing of the present invention. The specific program may be constructed as an individual program for attaining the above functions or alternatively as part of the program for driving the printing apparatus.

Typical examples of the recording medium include flexible disks, CD-ROMs, magneto-optic discs, IC cards, ROM cartridges, punched cards, prints with barcodes or other codes printed thereon, internal storage devices (memories like a RAM and a ROM) and external storage devices of the computer, and a variety of other computer readable media. The principle of the present invention may also be attained by a program supply unit, from which the computer program is supplied to the computer, as well as the computer program itself and a diversity of equivalent signals.

These and other objects, features, aspects, and advantages of the present invention will become more apparent from the following detailed description of the preferred embodiments with the accompanying drawings.

BRIEF DESCRIPTION OF THE DRAWINGS

FIG. 9 shows a noise data matrix for light cyan;

FIG. 10 shows a noise data matrix for light magenta;

DESCRIPTION OF THE PREFERRED EMBODIMENTS (1) Structure of Apparatus

Figure 1:
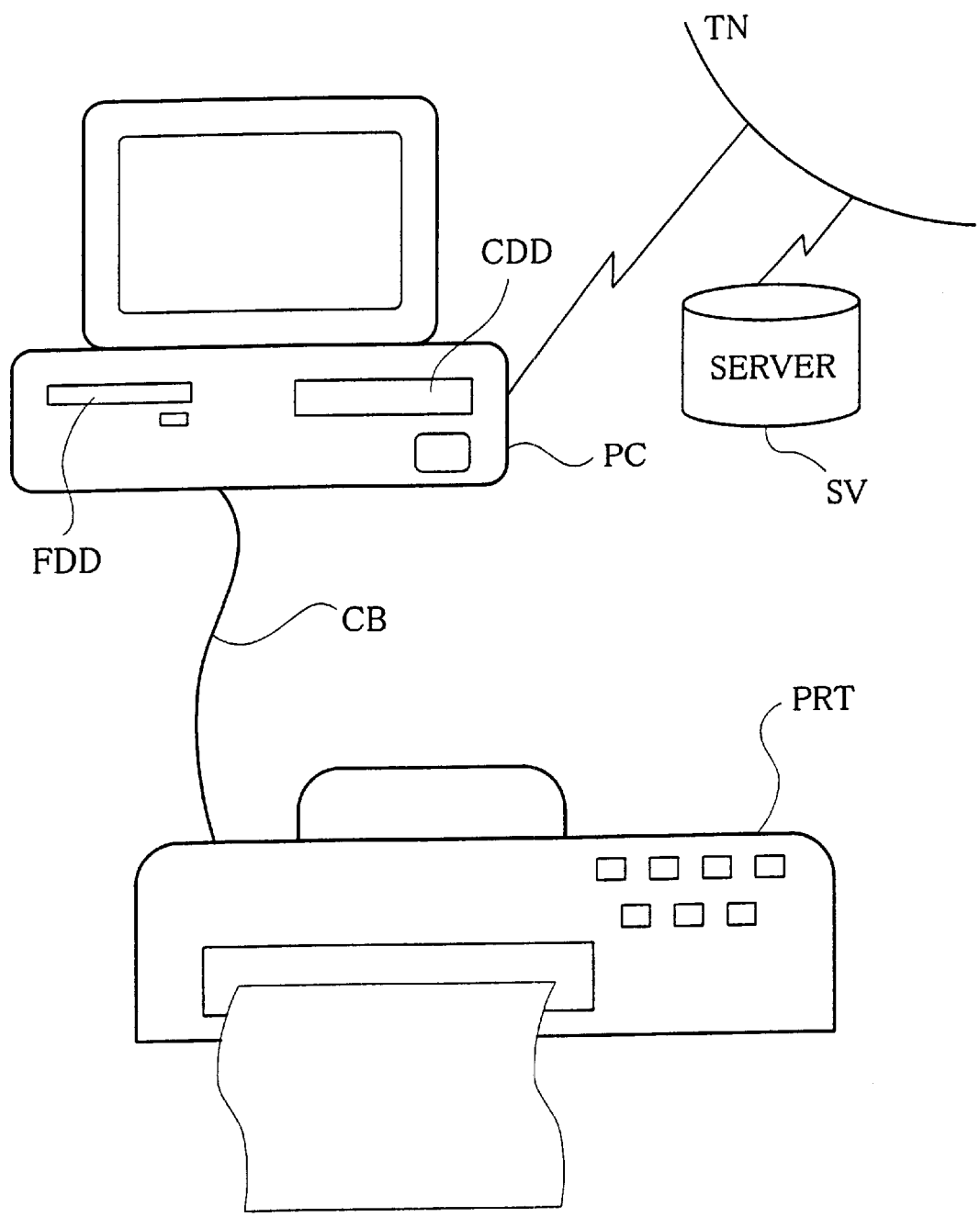
FIG. 1 schematically illustrates the structure of an image processing apparatus and a printing apparatus in one embodiment of the present invention.

Some modes of carrying out the present invention are discussed below as preferred embodiments. FIG. 1 schematically illustrates the structure of an image processing apparatus and a printing apparatus in one embodiment of the present invention. The printing apparatus of this embodiment includes a printer PRT connected to a computer PC via a cable CB. The computer PC functions as an image processing apparatus that generates print data to be transferred to the printer PRT and also functions to control operations of the printer PRT. The function as the image processing apparatus and the function of controlling operations of the printer PRT are based on a program called a printer driver.

The computer PC loads a required program from a recording medium, such as a flexible disk or a CD-ROM, via a flexible disk drive FDD or a CD-ROM drive CDD and executes the loaded program. The computer PC is further connected to an external network TN and gains access to a specific server SV to download required programs. The program required for image processing and printing may be collectively loaded as a whole, or alternatively only part of the program may be loaded as modules.

Figure 2:
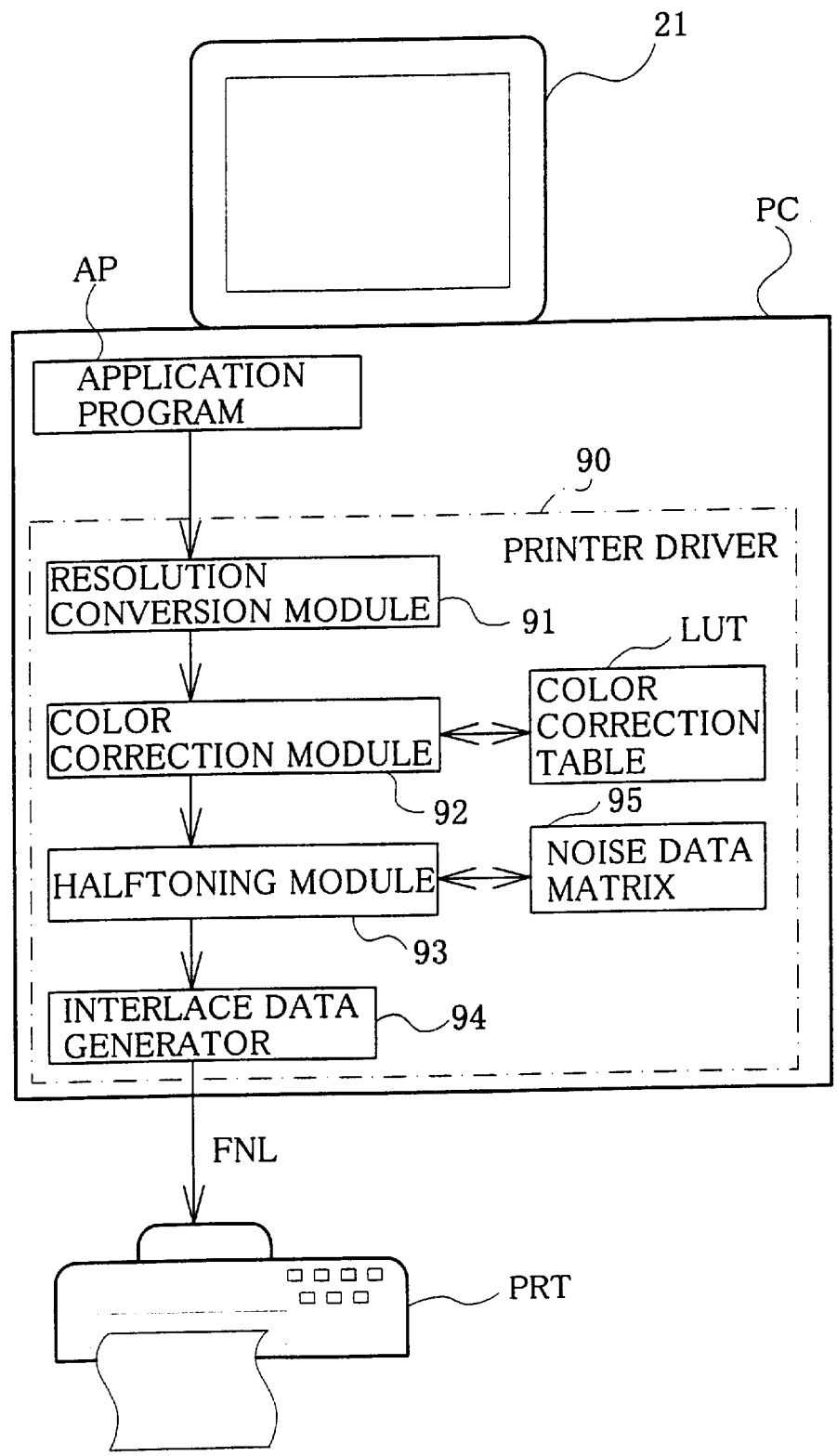
FIG. 2 is a block diagram showing functional blocks of the image processing apparatus of the embodiment.

FIG. 2 is a block diagram showing functional blocks of the image processing apparatus of the embodiment. In the computer PC, an application program AP works under a preset operating system. A printer driver 90 is incorporated in the operating system. The application program AP generates color image data expressed by the tone values of red (R), green (G), and blue (B).

When the application program AP issues a printing instruction, the printer driver 90 in the computer PC receives image data from the application program AP and converts the image data into signals processible by the printer PRT. In the embodiment of FIG. 2, a resolution conversion module 91, a color correction module 92, a halftoning module 93, and an interlace data generator 94 are provided as functional blocks of carrying out the conversion process in the printer driver 90. The printer driver 90 further includes a color correction table LUT, which is referred to by the color correction module 92, and a noise data matrix 95, which is referred to by the halftoning module 93.

The resolution conversion module 91 functions to convert the resolution of color image data processed by the application program AP, that is, the number of pixels per unit length, into the resolution corresponding to printing conditions according to the requirements. The color correction module 92 refers to the color correction table LUT and converts the color components R, G, and B of the image data into the tone values of the respective hues used in the printer PRT with regard to each pixel. As discussed later, the printer PRT uses six color inks, cyan (C), light cyan (LC), magenta (M), light magenta (LM), yellow (Y), and black (K). The color correction table LUT specifies the recording rates of dots created with the respective colors to express each color defined by the tone values of R, G, and B. In this embodiment, the color correction table LUT gives 8-bit data, that is, 256-tone data, with regard to each color ink.

The printer PRT is able to express only two tones, that is, either dot-on or dot-off, in each pixel. The halftoning module 93 carries out the halftoning process to enable the printer PRT to express multiple tones in the form of a distribution of dots. The halftoning module 93 namely determines the dot on-off state of each ink with regard to each pixel, based on the tone value of image data. In this embodiment, the error diffusion method is applied for the halftoning process. As discussed later, the halftoning process is performed by reflecting noise data stored in the nose data matrix 95.

The image data processed in the above manner are rearranged to a sequence of data to be transferred to the printer PRT by the interlace data generator 94 and output as final print data FNL. The printer PRT carries out main scan and sub-scan of a print head and creates dots on a sheet of printing paper based on the print data FNL transferred from the printer driver 90, so as to print an image. Although the printer PRT only has the function of creating dots according to the input print data FNL in this embodiment, the printer PRT itself may perform the series of image processing.

Figure 3:
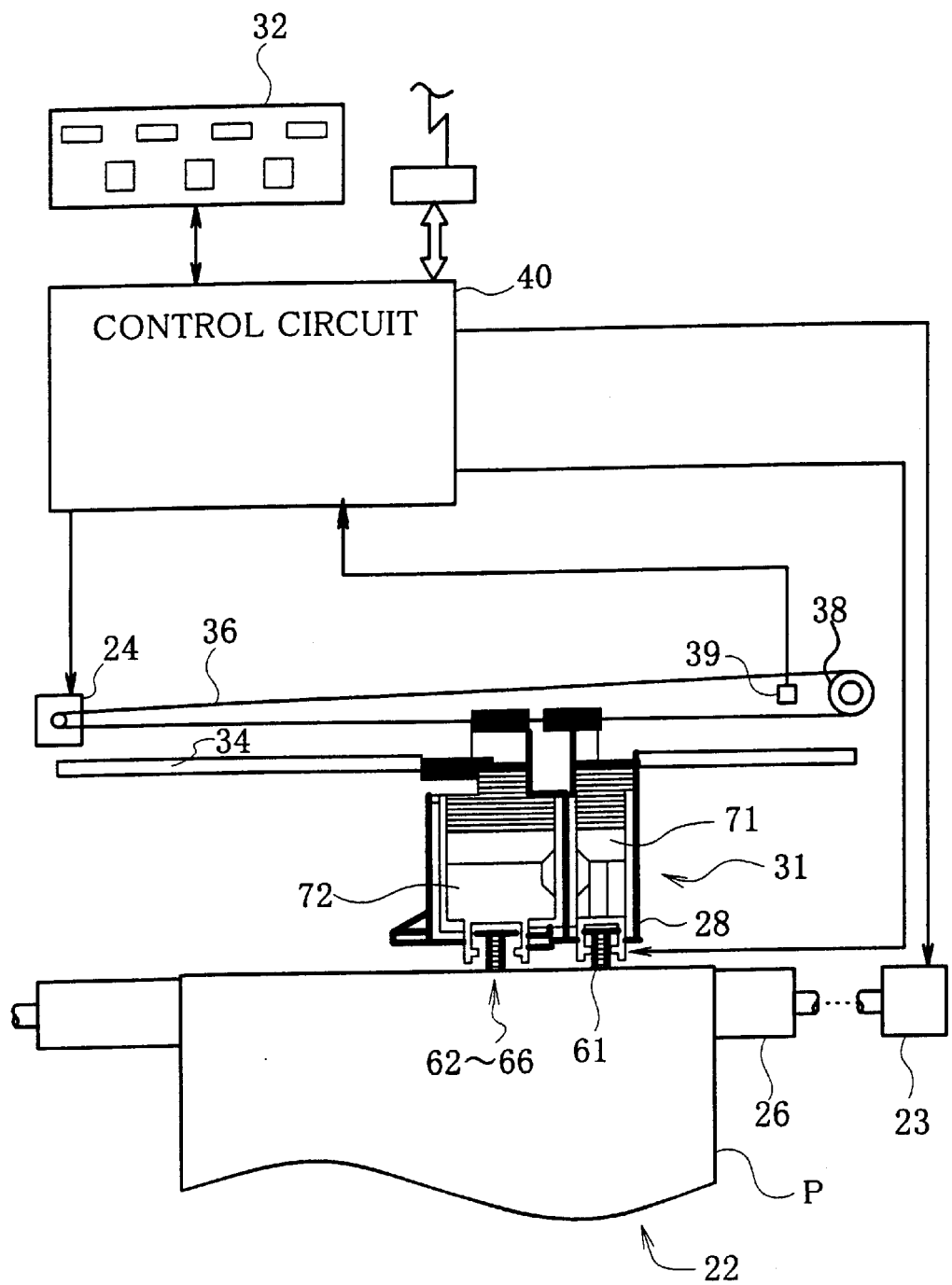
FIG. 3 schematically illustrates the structure of a printer PRT included in the printing apparatus of the embodiment.

FIG. 3 schematically illustrates the structure of the printer PRT. The printer PRT has a circuit of driving a sheet feed motor 23 to feed a sheet of printing paper P, a circuit of driving a carriage motor 24 to move a carriage 31 forward and backward along an axis of a platen 26, a circuit of driving a print head 28 mounted on the carriage 31 to implement ink ejection and dot creation, and a control unit 40 that controls transmission of signals to and from the sheet feed motor 23, the carriage motor 24, the print head 28, and a control panel 32.

The circuit of reciprocating the carriage 31 along the axis of the platen 26 includes a sliding shaft 34 that is disposed in parallel with the axis of the platen 26 to slidably support the carriage 31, a pulley 38, an endless drive belt 36 that is spanned between the carriage motor 24 and the pulley 38, and a position sensor 39 that detects the position of the origin of the carriage 31.

A black ink cartridge 71 for black ink (K) and a color ink cartridge 72 in which five color inks, that is, cyan (C), light cyan (LC), magenta (M), light magenta (LM), and yellow (Y), are accommodated are detachably attached to the carriage 31 in the printer PRT. A total of six ink ejection heads 61 through 66 are formed on the print head 28 that is disposed in the lower portion of the carriage 31. Ink conduits 68 are formed in the bottom of the carriage 31 to lead supplies of inks from ink reservoirs to the respective ink ejection heads.

Figure 4:
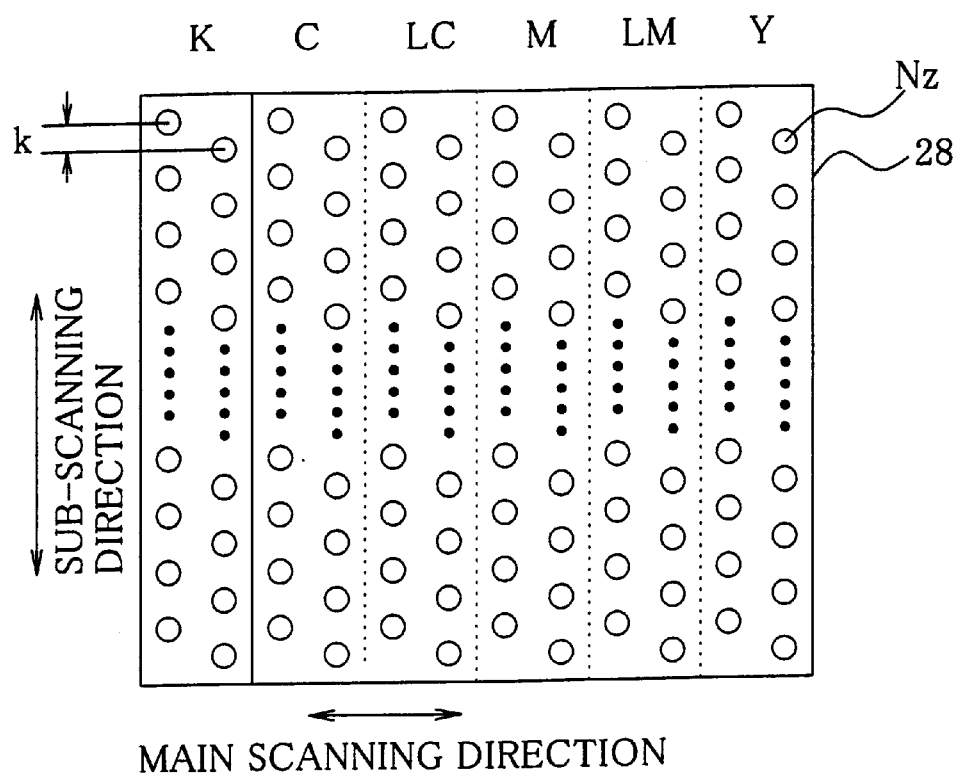
FIG. 4 shows an arrangement of nozzles Nz in ink ejection heads 61 through 66 of the printer PRT.

FIG. 4 shows an arrangement of nozzles Nz in the respective ink ejection heads 61 through 66. The arrangement of nozzles shown in FIG. 4 includes six nozzle arrays respectively corresponding to the six color inks. Each nozzle array includes forty-eight nozzles Nz arranged in zigzag at a fixed nozzle pitch k. The positions of the corresponding nozzles in the respective nozzle arrays are coincident with one another in a sub-scanning direction.

Figure 5:
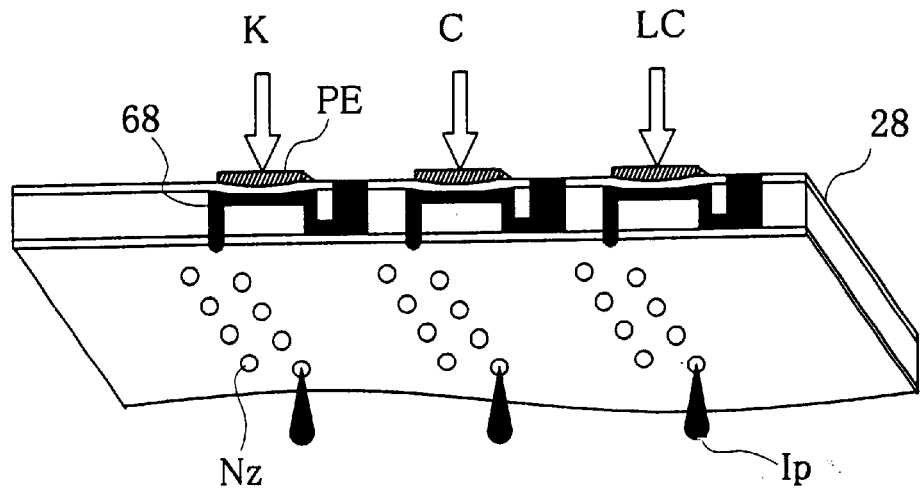
FIG. 5 shows the principle of dot creation by a print head 28 in the printer PRT.

FIG. 5 shows the principle of dot creation by the print head 28. For the clarity of illustration, only the part relating to the ink ejection with regard to the three color inks K, C, and LC is shown. When the ink cartridges 71 and 72 are attached to the carriage 31, the supplies of the respective color inks flow through the ink conduits 68 shown in FIG. 5 and are fed to the corresponding ink ejection heads 61 through 66. In the ink ejection heads 61 through 66, a piezoelectric element PE is provided for each nozzle. As is known by those skilled in the art, the piezoelectric element PE deforms its crystal structure by application of a voltage and implements an extremely high-speed conversion of electrical energy into mechanical energy. When a preset voltage is applied between electrodes on either end of the piezoelectric element PE for a predetermined time period, the piezoelectric element PE is expanded for the predetermined time period to deform one side wall of the ink conduit 68 as shown by the arrows in FIG. 5. The volume of the ink conduit 68 is reduced according to the expansion of the piezoelectric element PE. A certain amount of ink corresponding to the reduction is ejected as an ink particle Ip from the nozzle Nz at a high speed. The ink particles Ip soak into the printing paper P set on the platen 26, so as to implement printing.

The control circuit 40 that controls the respective functions of the printer PRT is constructed as a microcomputer including a CPU, a RPOM, and a RAM. The control circuit 40 includes a transmitter that outputs driving waveforms to the respective ink ejection heads 61 through 66 to drive the piezoelectric elements. When the control circuit 40 outputs driving waveforms to the respective nozzles of the ink ejection heads 61 through 66 according to the data specifying the dot on-off state of each pixel, each nozzle set in the on state ejects ink based on the principle discussed above.

The printer PRT having the hardware structure discussed above repeatedly carries out sub-scan, which feeds the printing paper P by means of the sheet feed motor 23, and main scan, which drives the piezoelectric elements PE of the respective ink ejection heads 61 through 66 to create dots while moving the carriage 31 back and forth by means of the carriage motor 24. This results in printing a monochromatic image in multiple tones on the printing paper P.

In this embodiment, the printer PRT has the print head that uses the piezoelectric elements PE to eject ink as discussed previously. The printer may, however, apply another method for ink ejection. The technique of the present invention is applicable, for example, to a printer that supplies power to a heater disposed in each ink conduit and utilizes the bubbles generated in the ink conduit to eject ink. The principle of the present invention is applicable to a diversity of printers other than the ink jet printers and any ink ejection-type printers, for example, thermal transfer printers, sublimation printers, and impact dot printers.

(2) Print Data Generation Routine

Figure 6:
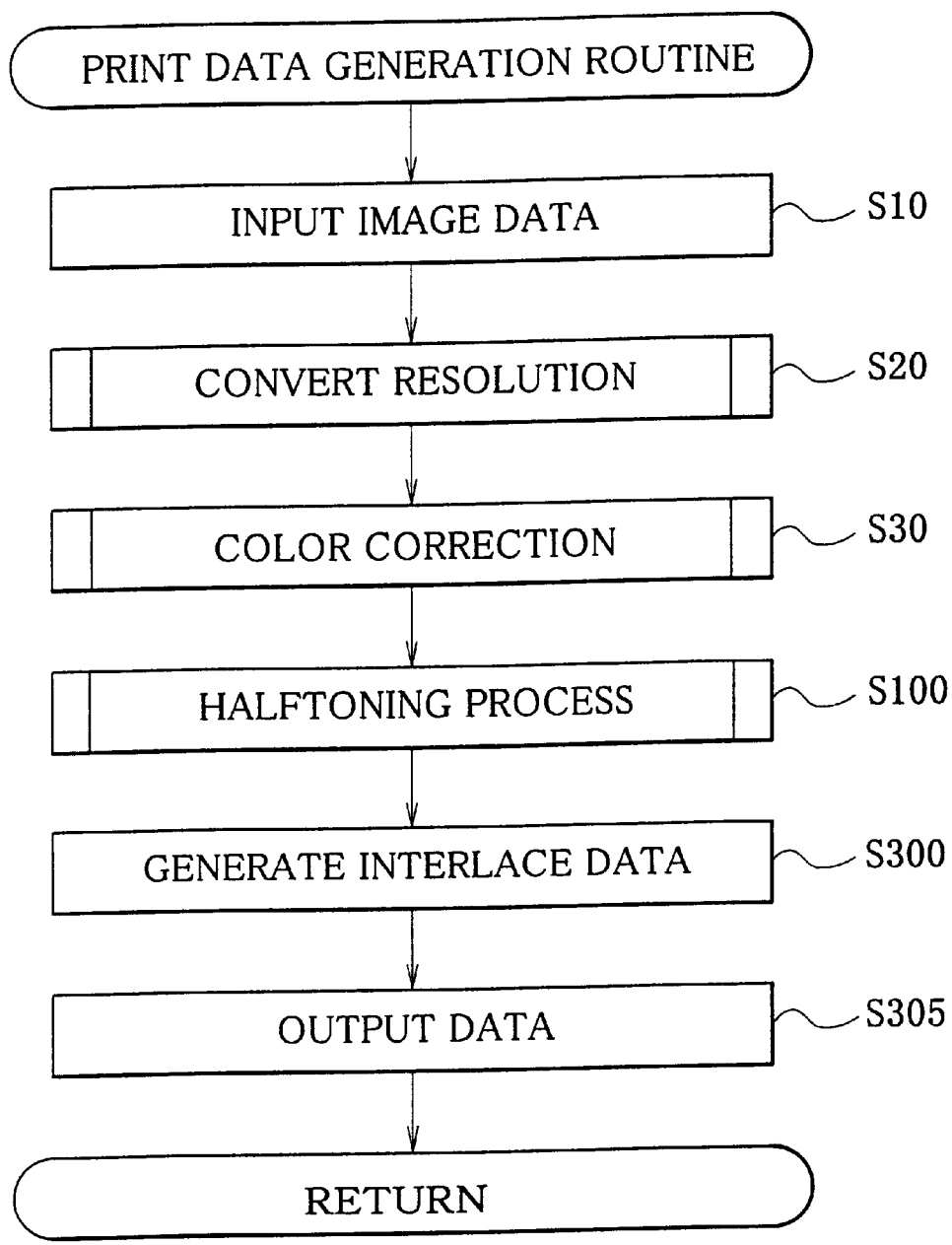
FIG. 6 is a flowchart showing a print data generation routine executed in the embodiment.

FIG. 6 is a flowchart showing a print data generation routine. This routine is the processing in the printer driver 90 and executed by the CPU in the computer PC in this embodiment.

When the program enters the print data generation routine, the CPU first inputs image data at step S10. The image data are sent from the application program shown in FIG. 2 and include tone values in the range of 0 to 255 with regard to the respective colors R, G, and B for the respective pixels constituting an image. The CPU subsequently converts the resolution of the input image data into the printing resolution in the printer PRT at step S20.

The CPU subsequently carries out the color correction at step S30. As described previously, the color correction process converts the image data defined by the tone values of R, G, and B into the tone data corresponding to the respective hues used in the printer PRT. The procedure of color correction refers to the color correction table LUT that maps each color defined by a combination of R, G, and B to a color defined by a combination of the respective hues corresponding to the color inks used in the printer PRT. A variety of known techniques are applicable to the color correction process utilizing the color correction table LUT. One applicable procedure interpolates data in the color correction table LUT according to the tone values of the input image data. The color correction process results in converting the image data into the tone data having 256 tones with regard to each hue.

The CPU then carries out halftoning of the color-corrected image data at step S100. In this embodiment, the error diffusion method is applied for the halftoning process. The details of the halftoning process will be discussed later. After completion of the halftoning process, the CPU generates interlace data at step S300. The interlace data are generated by rearranging data of each raster line to a sequence of data to be transferred to the printer PRT. The printer PRT may form raster lines according to any of various recording modes. The simplest mode creates all the dots on each raster line by a single forward scan of the print head. In this case, the data of each raster line should be output to the print head in the order of the processing. There is another mode called overlapping. In the overlapping mode, for example, dots are alternately created on each raster line by a first pass of the main scan, and the remaining dots on the same raster line are created by a second pass of the main scan. In this case, each raster line is completed by two passes of the main scan. In the case where the overlapping mode is adopted in the recording process, data to be transferred to the print head are obtained by alternately picking up dots on each raster line. The processing of step S300 generates the data to be transferred to the print head according to the recording method adopted in the printer PRT. The method of generating the interlace data is selected according to independently input printing conditions. After generation of the data printable by the printer PRT, the CPU outputs the generated interlace data to the printer PRT at step S305. The printer PRT receives the interlace data and creates dots in the respective pixels to print an image.

Figure 7:
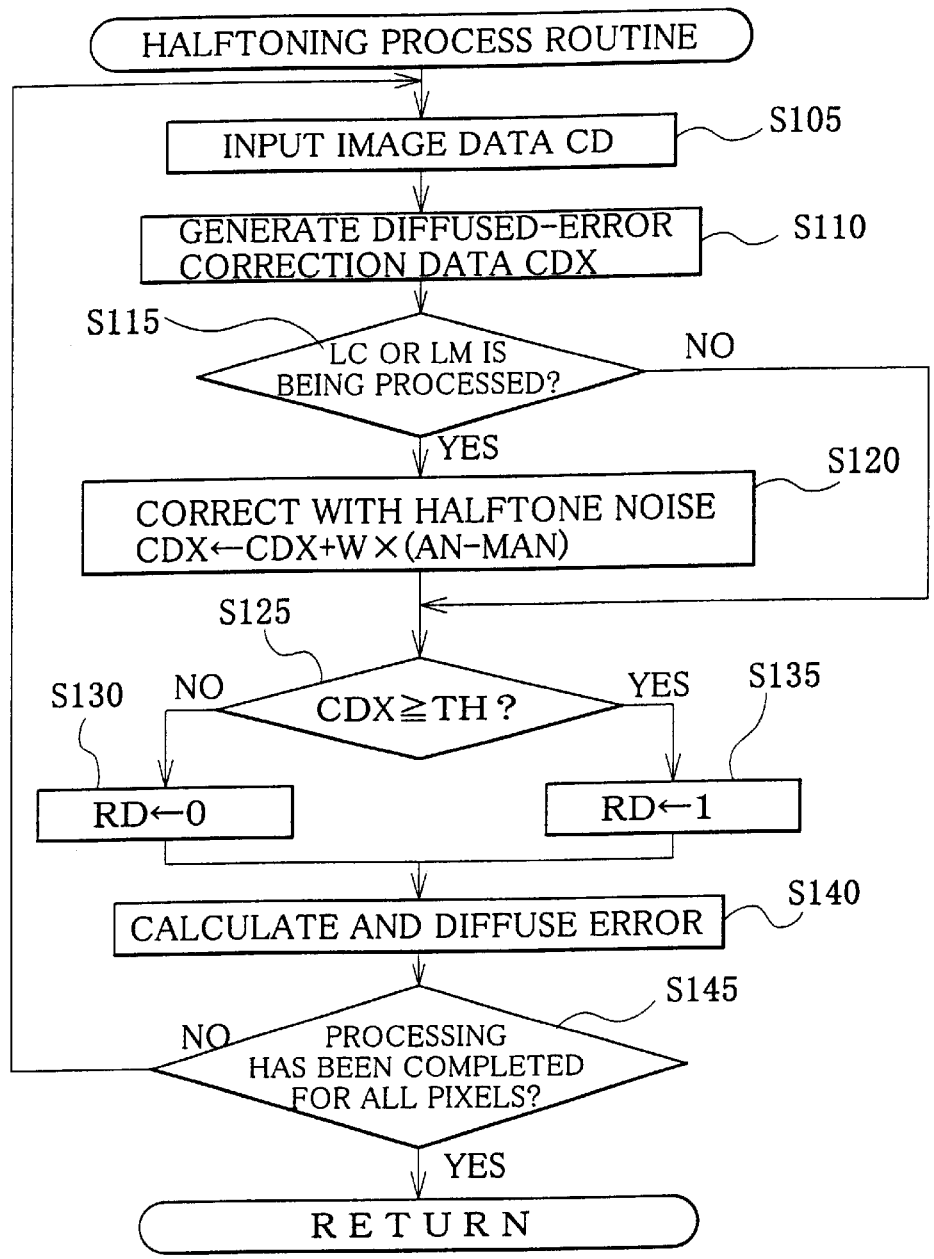
FIG. 7 is a flowchart showing a halftoning process routine executed in the embodiment.

The following describes the halftoning process carried out in this embodiment. FIG. 7 is a flowchart showing a halftoning process routine. As mentioned previously, the error diffusion method is applied for the halftoning process in this embodiment. Prior to the description of the flowchart shown in FIG. 7, the error diffusion method is explained briefly. The image data may take any positive tone value in the range of 0 to 255, whereas only two tones, that is, the density under the dot-on condition and the density under the dot-off condition, are expressible in each pixel. Namely there is a quantization error or difference between the dot on-off state in each pixel and the tone value of the image data in the pixel. More specifically the quantization error is given as a difference between a quantization value showing the result of the determination of the dot on-off state by the tone value in the range of 256 levels and the tone value of the image data. The error diffusion method diffuses the quantization error occurring in each pixel to peripheral unprocessed pixels. The determination of the dot on-off state in each pixel is performed by reflecting the total of the divisions of quantization errors diffused from the peripheral processed pixels. The error diffusion method repeatedly carries out the diffusion and reflection of the quantization errors, so as to minimize the local quantization error made in the halftoning process. The CPU repeatedly executes the series of the processing shown in the flowchart of FIG. 7 for the respective inks, although the repetition is omitted from the illustration for the purpose of simplicity.

Figure 8:
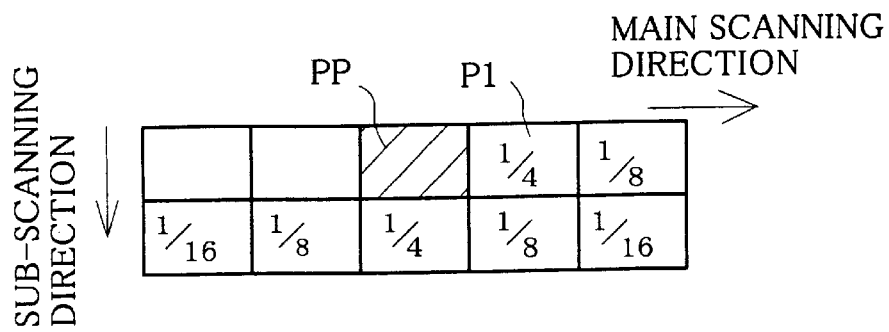
FIG. 8 shows an example of error diffusion from a pixel of interest PP to peripheral unprocessed pixels.

When the program enters the halftoning process routine, the CPU first receives image data CD at step S105 and generates diffused-error correction data CDX at step S110. The diffused-error correction data CDX is obtained by reflecting the quantization errors made by the peripheral processed pixels onto the image data in a pixel of interest, which is currently processed. FIG. 8 shows an example of error diffusion from a pixel of interest PP to peripheral unprocessed pixels. The error made by the pixel of interest PP is diffused to the peripheral unprocessed pixels with predetermined weights shown in FIG. 8. The pixel of interest PP, on the other hand, has received the divisions of errors diffused from the peripheral processed pixels with the predetermined weights. The diffused-error correction data CD is generated by adding the total of the diffused errors to the original tone value.

The CPU then determines whether or not the currently processed color is either light cyan LC or light magenta LM at step S115. The technique of this embodiment adopts a different procedure of halftoning for these two colors from the procedure adopted for the other colors. In the case where the currently processed color is either light cyan LC or light magenta LM, the CPU further corrects the diffused-error correction data CDX with a halftone noise according to Equation (1) given below at step S120:

$$CDX \leftarrow CDX + W \times (AN - MAN) \qquad (1)$$

AN represents noise data previously set as the noise data matrix 95. FIG. 9 shows a noise data matrix for light cyan. Data specified in each pixel by the two-dimensional matrix corresponds to the noise data AN. In the example of FIG. 9, the noise data are set in the value range of 0 to 44. The error diffusion method determines the dot on-off state based on the comparison between the diffused-error correction data CDX and a preset threshold value TH as discussed later. There is the higher possibility of dot creation in the pixel having the greater diffused-error correction data CDX. The pixels having threshold values of not less than 37 are hatched in FIG. 9 for the purpose of visual perception of the pixels having the greater change of dot creation. As illustrated in FIG. 9, dots are created in a locally concentrated manner according to a predetermined pattern. This pattern is a halftone dot-simulating pattern. As in the case of the halftone expression, the area of the local dot concentration is varied according to the value of the diffused-error correction data CDX.

FIG. 10 shows a noise data matrix for light magenta. The technique of this embodiment uses different noise patterns for light cyan and light magenta. In the case of screen printing, the screen angle, that is, the angle of the arrangement of dots, is generally varied for each color, in order to reduce the occurrence of an interference pattern called moiré. In this embodiment, the noise data matrixes applied for light cyan and light magenta simulate halftone dot patterns having a relative screen angle difference of 30 degrees.

The variable MAN used in Equation (1) represents the mean value of the noise data matrix. The matrixes shown in FIGS. 9 and 10 use the noise data in the value range of 0 to 44, so that the mean value MAN is equal to 22. This value MAN is used to shift the noise data, in order to make the mean value of the noise data added to the whole image equal to zero in the process of the correction with the halftone noise. The variable MAN may be omitted when the provided noise data matrix has the mean value equal to zero.

The variable W used in Equation (1) given above is a weight coefficient to vary the effect of the noise data and may be set equal to any arbitrary value. An appropriate value is selected for the variable W to attain the desired effects and picture quality according to the tone value range of the image data and the value range of the noise data. This value W may be set to a fixed value or alternatively may be varied by the user.

After completion of the correction with the halftone noise, the CPU compares the processed diffused-error correction data CDX with a predetermined threshold value TH at step S125. With regard to the colors other than light cyan and light magenta, the diffused-error correction data CDX obtained at step S110 is compared with the predetermined threshold value TH at step S125. In the case where the diffused-error correction data CDX is not less than the predetermined threshold value TH, the CPU determines that a dot is to be created in the pixel and sets a value '1' representing the dot-on state to a resulting value RD showing the result of the processing at step S135. In the case where the diffused-error correction data CDX is less than the predetermined threshold value TH, on the contrary, the CPU determines that no dot is to be created in the pixel and sets a value '0' representing the dot-off state to the resulting value RD at step S130. Any value may be set to the threshold value TH. In this embodiment, the threshold value TH is equal to the mean of the quantization value in the dot-on state and the quantization value in the dot-off state.

The CPU subsequently calculates an error Err made by the multi-valuing process and diffuses the error to peripheral unprocessed pixels at step S140. The error ERR is obtained by subtracting the quantization value expressed by each dot after the multi-valuing process from the diffused-error correction data CDX. In one example, it is assumed that there are pixels respectively having the tone value 255 and the tone value 175 as the diffused-error correction data CDX. The quantization value in the dot-on state is equal to 255, and the quantization value in the dot-off state is equal to 0. When it is determined that a dot is to be created in the pixel having the tone value 255, the tone value of the image data and the expressed quantization value are both equal to 255, so that the error Err=0. When it is determined that a dot is to be created in the pixel having the tone value 175, on the other hand, the error Err=175−255=−80.

The calculated error Err is diffused to peripheral unprocessed pixels with the predetermined weights shown in FIG. 8. For example, when the pixel of interest PP has the calculated error Err=−80, a division '−20' that is one quarter of the error Err is diffused to an adjoining pixel P1. Respective divisions of the error corresponding to the weights shown in FIG. 8 are diffused to the other pixels. The diffused-error correction data CDX is generated by adding the total of the divisions of errors diffused to the pixel of interest, which is currently being processed, to the image data CD input at step S105. The CPU repeatedly executes the series of the processing discussed above with regard to all the pixels for all the colors at step S145, before exiting from this halftoning process routine.

The printing apparatus of the embodiment discussed above enables a halftone dot-simulating image to be printed with high picture quality. The technique of the embodiment adds the noise data simulating halftone dots to the image data to generate the halftone dot-simulating image data, and subsequently carries out the halftoning process according to the error diffusion method. The error diffusion method is generally applied to process standard images. This arrangement thus ensures the high-quality halftoning process with regard to the halftone dot-simulating image. Because of this function, the printing apparatus of the embodiment gives the halftone dot-simulating printed image of high picture quality.

The printing apparatus of this embodiment carries out the halftoning process according to the technique of error diffusion and thereby enables printing of a halftone image with sufficient dispersibility of dots. This arrangement effectively prevents the extreme local concentration of dots and enables dots to be created within the duty restriction. This arrangement also prevents the periodical variation in density of dots and thereby reduces the potential unevenness of density due to the interference with a variation in ink ejection characteristics. Varying the variable W used in the process of correction with the halftone noise flexibly adjusts the effects of halftoning.

In the procedure described above, the correction with a halftone noise is carried out after generation of the diffused-error correction data CDX. The order of the processing may be inverted. The inverted procedure carries out the correction with a halftone noise before generating the diffused-error correction data CDX. The series of the processing discussed above corrects the image data with the halftone noise. One modified procedure corrects each threshold value TH with a halftone noise according to Equation (2) given below. In the case of addition of the halftone noise to the image data, the added halftone noise affects the result of the error diffusion. In the case of addition of the halftone noise to the threshold value TH, on the other hand, the halftone noise does not affect the calculation of the error. There is accordingly a little difference in dot appearance. More specifically, the procedure of adding the noises to the image data gives clearer dots, while the procedure of adding the noises to the threshold values still forms sufficient dots. Either of the procedures may be adopted according to the requirements.

$$TH \leftarrow TH - W \times (AN - MAN) \qquad (2)$$

(3) Second Embodiment

The following describes an image processing apparatus and a printing apparatus in a second embodiment of the present invention. The image processing apparatus and the printing apparatus of the second embodiment have the same hardware structure as that of the first embodiment. The arrangement of the second embodiment varies the voltage waveform output to each nozzle formed in the print head 28, so as to create dots having different quantities of ink, that is, a large-sized dot, a medium-sized dot, and a small-sided dot in the descending sequence of the quantity of ink.

Figure 11:
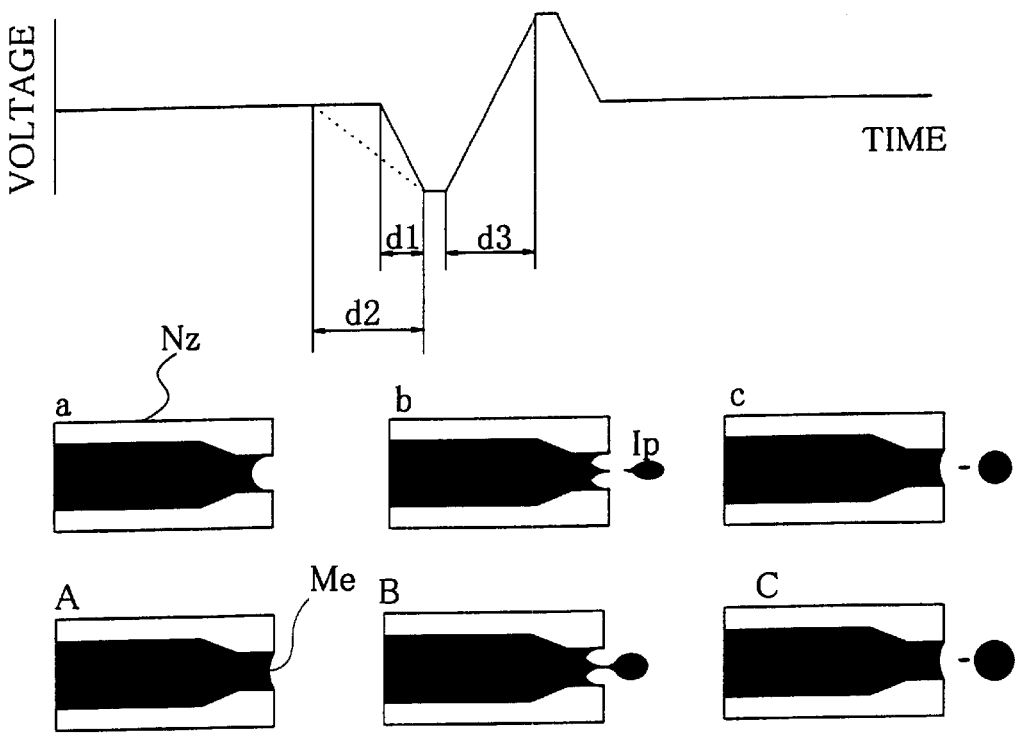
FIG. 11 shows the relationship between the driving waveform and the size of the ink particle Ip ejected from the nozzle Nz.

The principle of creating these three different types of dots is discussed. FIG. 11 shows the relationship between the driving waveform and the size of the ink particle Ip ejected from the nozzle Nz. The driving waveform shown by the broken line in FIG. 11 represents a voltage waveform applied to create standard-size dots. Application of a voltage lower than a reference voltage to the piezoelectric element PE in a division d2 deforms the piezoelectric element PE in the direction of increasing the cross section of the ink conduit 68. The speed of the deformation is higher than the ink feeding speed from the ink conduit 68. The ink interface Me called meniscus is thus concaved inward the nozzle Nz as shown in state A of FIG. 11. When the driving waveform shown by the solid line in FIG. 11 is used to abruptly lower the voltage in a division dl, the deformation of the ink conduit 68 is implemented at a higher speed. The meniscus Me is thereby more significantly concaved inward the nozzle Nz as shown in state 'a', compared with the state A. A subsequent increase in voltage applied to the piezoelectric element PE in a division d3 causes ink to be ejected. As shown in states B and C, a large ink droplet is ejected when the meniscus Me is only slightly concaved inward (state A). As shown in states 'b' and 'c', on the other hand, a small ink droplet is ejected when the meniscus Me is significantly concaved inward (state 'a').

Figure 12:
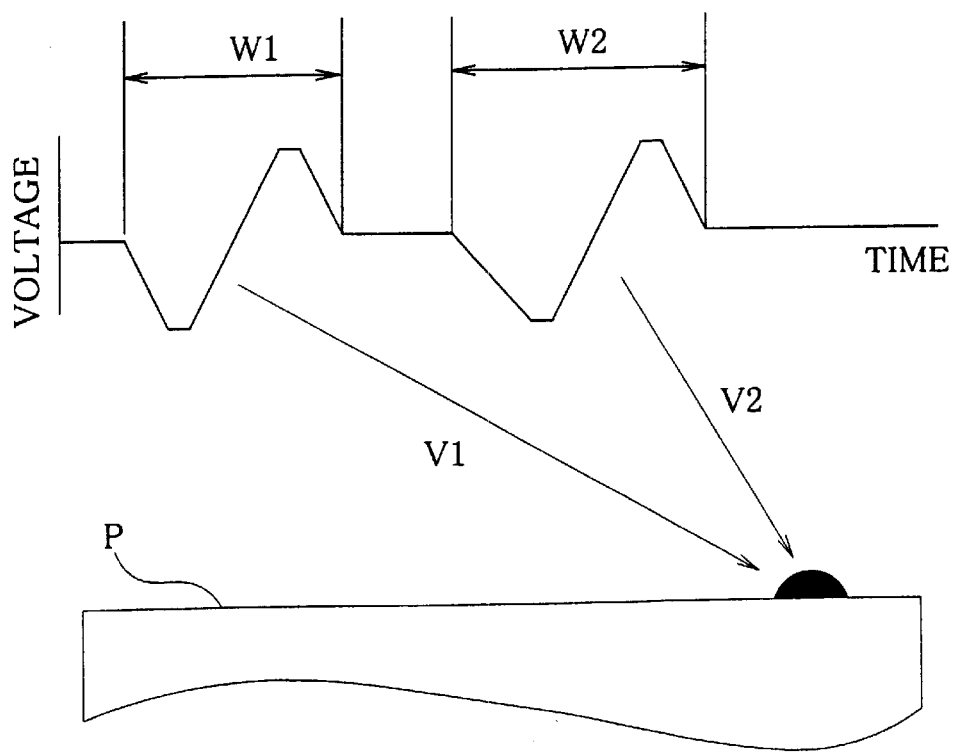
FIG. 12 shows driving waveforms used in a second embodiment of the present invention.

The weight of ink ejected is varied according to the rate of change in the decrease of the potential of the piezoelectric element PE (see the divisions d1 and d2), that is, according to the driving waveform applied to drive the respective nozzles. FIG. 12 shows driving waveforms used in the second embodiment. The procedure of the second embodiment provides two different driving waveforms, that is, a driving waveform W1 for creating small-sized dots and a driving waveform W2 for creating medium-sized dots. The driving waveforms W1 and W2 are output at a specific interval that allows the respective dots to be created in each pixel with the movement of the carriage 31. The greater weight of ink generally results in the higher jet speed of the ink droplet. In the printer PRT, the jet speeds of the respective ink droplets are adjusted to cause the small-sized dot and the medium-sized dot to hit against a substantially identical position on the printing paper P. Ejection of ink droplets in response to both the driving waveforms W1 and W2 completes a large-sized dot.

Figure 13:
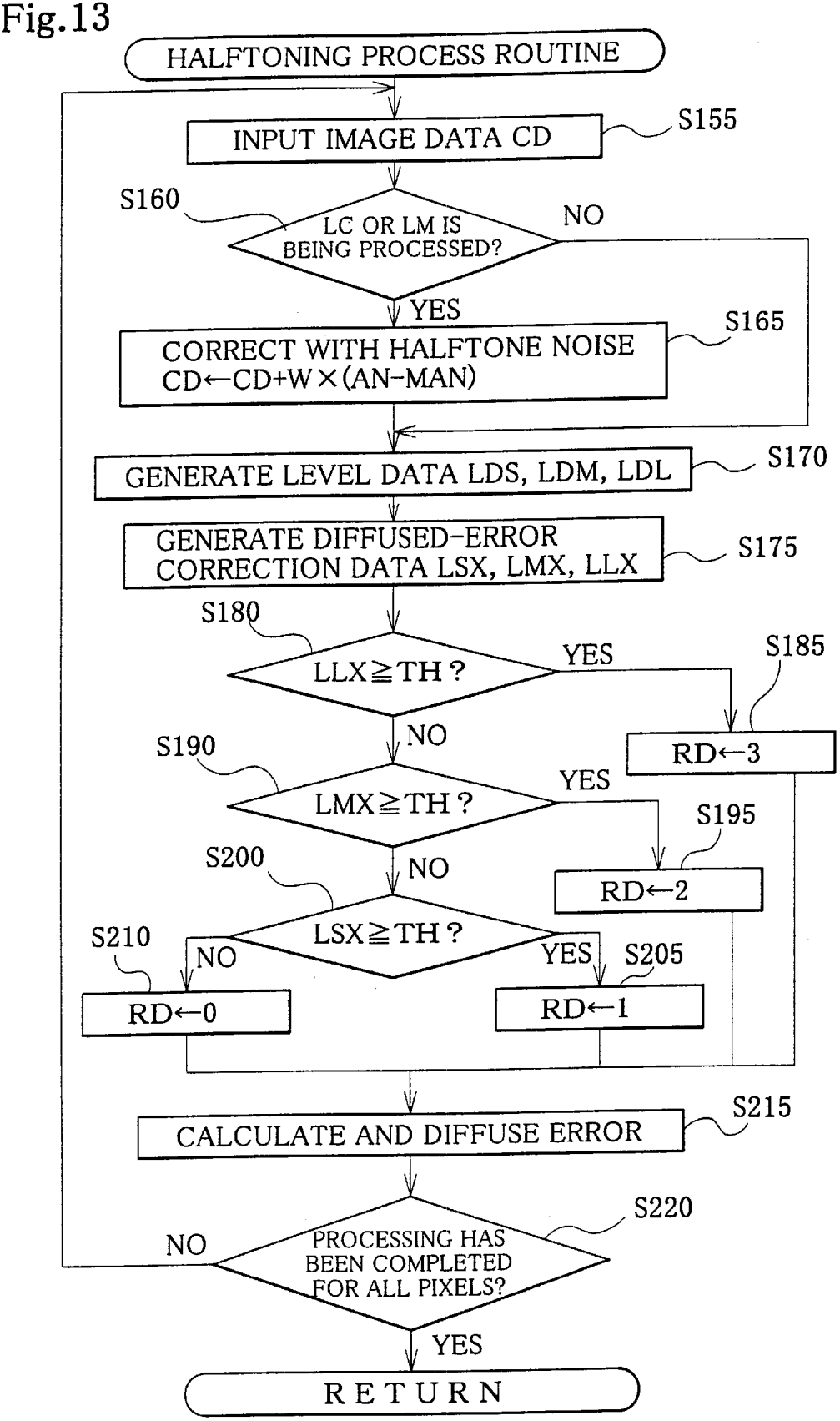
FIG. 13 is a flowchart showing a halftoning process routine executed in the second embodiment.

Since the technique of the second embodiment selectively uses these three variable-sized dots, the details of the halftoning process carried out in the second embodiment are different from those in the first embodiment. FIG. 13 is a flowchart showing a halftoning process routine executed in the second embodiment. Like the first embodiment, the technique of the second embodiment applies the error diffusion method for the halftoning process.

When the program enters the halftoning process routine of the second embodiment, the CPU first receives the image data CD at step S155. The input image data CD here are color-corrected image data as discussed in the first embodiment. The CPU then determines whether or not the currently processed color is either light cyan LC or light magenta LM at step S160. In the case where the currently processed color is either light cyan LC or light magenta LM, the CPU carries out correction with a halftone noise at step S165. The correction follows Equation (1) discussed previously in the first embodiment, and uses the noise data stored in the matrixes shown in FIGS. 9 and 10 as discussed in the first embodiment.

The CPU subsequently generates level data LDS, LDM, and LDL based on the image data CD at step S170. In the case of light cyan LC and light magenta LM, the level data LDS, LDM, and LDL are generated based on the image data CD after the correction with the halftone noise. With regard to the other colors, the level data LDS, LDM, and LDL are generated based on the original image data CD.

Figure 14:
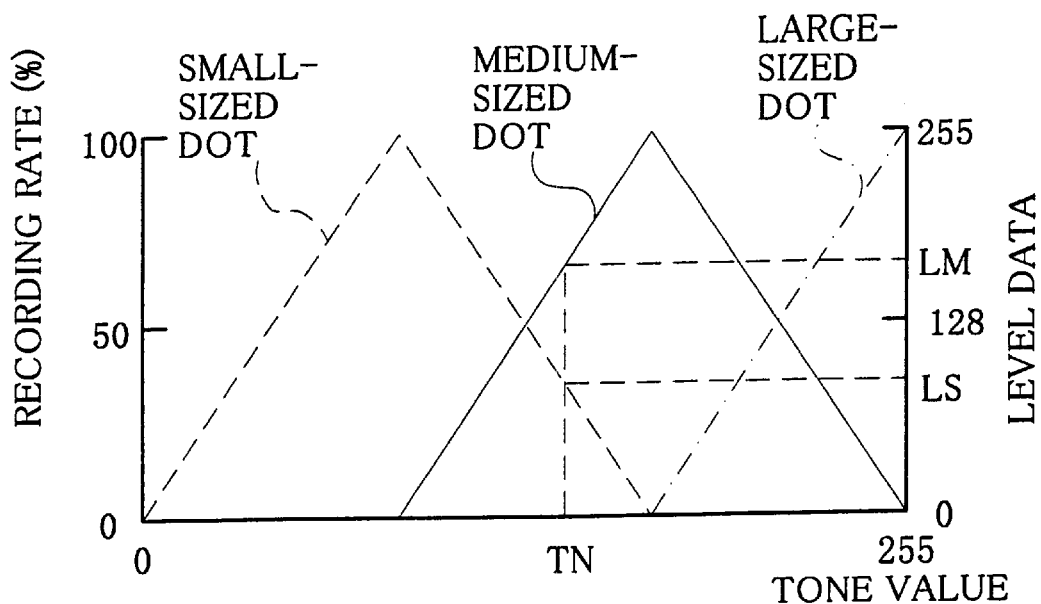
FIG. 14 shows the relationship between the tone value, the dot recording rate, and the level data.

The following describes generation of the level data. The level data represents the dot recording rate expressed in the value range of 0 to 255 according to the tone value of the image data. The level data LDS, LDM, and LDL respectively correspond to the small-sized dot, the medium-sized dot, and the large-sized dot. FIG. 14 shows the relationship between the tone value, the dot recording rate, and the level data. Each tone value is expressed by changing the recording rates of the small-sized dot, the medium-sized dot, and the large-sized dot. In the illustrated example, the small-sized dot is mainly used in the low tone area. In the tone area after the recording rate of the small-sized dot reaches 100%, the small-sized dots are gradually replaced with the medium-sized dots. In the tone area after the recording rate of the medium-sized dot reaches 100%, the medium-sized dots are gradually replaced with the large-sized dots. There are a variety of other settings for the dot recording rates to express the density corresponding to each tone value. Although only two variable-sized dots are used in combination in the example of FIG. 14, all the three variable-sized dots may be used at the same time.

The level data shows the dot recording rate at each tone value as 8-bit data, that is, in the value range of 0 to 255. For example, when the tone value of the image data is equal to TN, the level data for the medium-sized dot is LM and the level data for the small-sized dot is LS. In the technique of this embodiment, the level data are given as 8-bit data, which are suitable for the processing executed by the computer PC. The level data may be replaced with the dot recording rates.

Referring back to the flowchart of FIG. 13, the subsequent series of the halftoning process is described. After setting the level data LDS, LDM, and LDL, the CPU generates diffused-error correction data LSX, LMX, and LLX at step S175. Whereas the technique of the first embodiment reflects the error on the tone value of the image data, the technique of the second embodiment reflects the total error diffused from the peripheral processed pixels with regard to each variable-sized dot on the level data LDS, LDM, or LDL of each variable-sized dot, so as to generate the diffused-error correction data LSX, LMX, and LLX. Here LSX, LMX, and LLX respectively denote the diffused-error correction data with regard to the small-sized dot, the diffused-error correction data with regard to the medium-sized dot, and the diffused-error correction data with regard to the large-sized dot.

The CPU determines the dot on-off state based on the diffused-error correction data thus generated in the sequence of the large-sized dot, the medium-sized dot, and the small-sized dot. The CPU first compares the diffused-error correction data LLX with regard to the large-sized dot with a predetermined threshold value TH at step S180, in order to determine the on-off state of the large-sized dot. In the case where the diffused-error correction data LLX is not smaller than the predetermined threshold value TH, a value '3' representing the on state of the large-sized dot is set to a resulting value RD at step S185.

In the case where the diffused-error correction data LLX is smaller than the predetermined threshold value TH, the program proceeds to the determination of the on-off state of the medium-sized dot. The CPU compares the diffused-error correction data LMX with regard to the medium-sized dot with the predetermined threshold value TH at step S190, in order to determine the on-off state of the medium-sized dot. In the case where the diffused-error correction data LMX is not smaller than the predetermined threshold value TH, a value '2' representing the on state of the medium-sized dot is set to the resulting value RD at step S195.

In the case where the diffused-error correction data LMX is smaller than the predetermined threshold value TH, the program proceeds to the determination of the on-off state of the small-sized dot. The CPU compares the diffused-error correction data LSX with regard to the small-sized dot with the predetermined threshold value TH at step S200, in order to determine the on-off state of the small-sized dot. In the case where the diffused-error correction data LSX is not smaller than the predetermined threshold value TH, a value '1' representing the on state of the small-sized dot is set to the resulting value RD at step S205. In the case where the diffused-error correction data LSX is smaller than the predetermined threshold value TH, a value '0' representing the off state of any dot is set to the resulting value RD at step S210.

The series of the processing discussed above determines the dot on-off state with regard to all the large-sized dot, the medium-sized dot, and the small-sized dot. The CPU subsequently calculates the error from the resulting value RD and diffuses the calculated error at step S215. The calculation and the diffusion of the error is carried out separately for the large-sized dot, the medium-sized dot, and the small-sized dot. In the technique of the first embodiment, the error represents the difference between the tone value to be expressed in each pixel and the resulting quantization value according to the dot on-off state determined. In the arrangement of the second embodiment, on the other hand, the dot on-off state is determined according to the dot recording rate. The error is accordingly calculated from the dot recording rate, that is, the level data. For example, when it is determined that the large-sized dot is on in a certain pixel, the level data attained by creation of the large-sized dot is equal to 255, so that the error is the difference between the value 255 and the level data LLX with regard to the large-sized dot. When it is determined that the large-sized dot is off in a certain pixel, the level data attained by non-creation of the large-sized dot is equal to 0, so that the error is the difference between the value 0 and the level data LLX. As for the medium-sized dot and the small-sized dot, the error is similarly the difference between the level data attained (either the value 0 or the value 255) and the level data LMX or LSX to be expressed. The calculated error is diffused to peripheral unprocessed pixels with predetermined weights set in the table of FIG. 8 with regard to each variable-sized dot. The CPU repeatedly executes the series of the processing discussed above with regard to all the pixels for all the colors at step S220, before exiting from this halftoning process routine.

The printing apparatus of the second embodiment discussed above prints the halftone-dot simulating image with dots having different quantities of ink. Using the dots of different quantities of ink enables the smooth tone expression. The printing apparatus of the second embodiment thus attains the further improvement in picture quality of the resulting image. The second embodiment regards the arrangement using three variable-sized dots, although a greater number of variable-sized dots may be used instead. The arrangement of the second embodiment uses the level data and carries out the halftoning process according to the error diffusion method by reflecting the error with regard to each variable-sized dot. A variety of other methods may be applicable to determine the dot on-off state with regard to the three variable-sized dots. As discussed in the first embodiment, the halftone noise may be added to the threshold value TH in the second embodiment. Although the halftone noises are added to all the large-sized dot, the medium-sized dot, and the small-sized dot in the second embodiment, the halftone noises may be added only part of the dots, for example, only the small-sized dot.

(4) Third Embodiment

The following describes an image processing apparatus and a printing apparatus in a third embodiment of the present invention. The image processing apparatus and the printing apparatus of the third embodiment have the same hardware structure as that of the first embodiment. The arrangement of the third embodiment attains the binary expression, that is, the dot on state and the dot off state, with regard to each pixel. Like the second embodiment, the dots having different quantities of ink may be created in the arrangement of the third embodiment.

Figure 16:
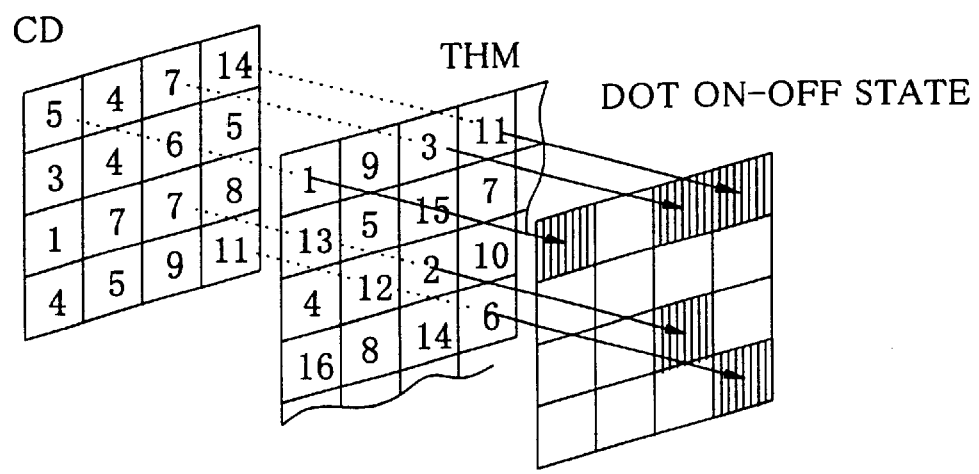
FIG. 16 shows the basic idea of determining the dot on-off state according to the dithering method.
Figure 15:
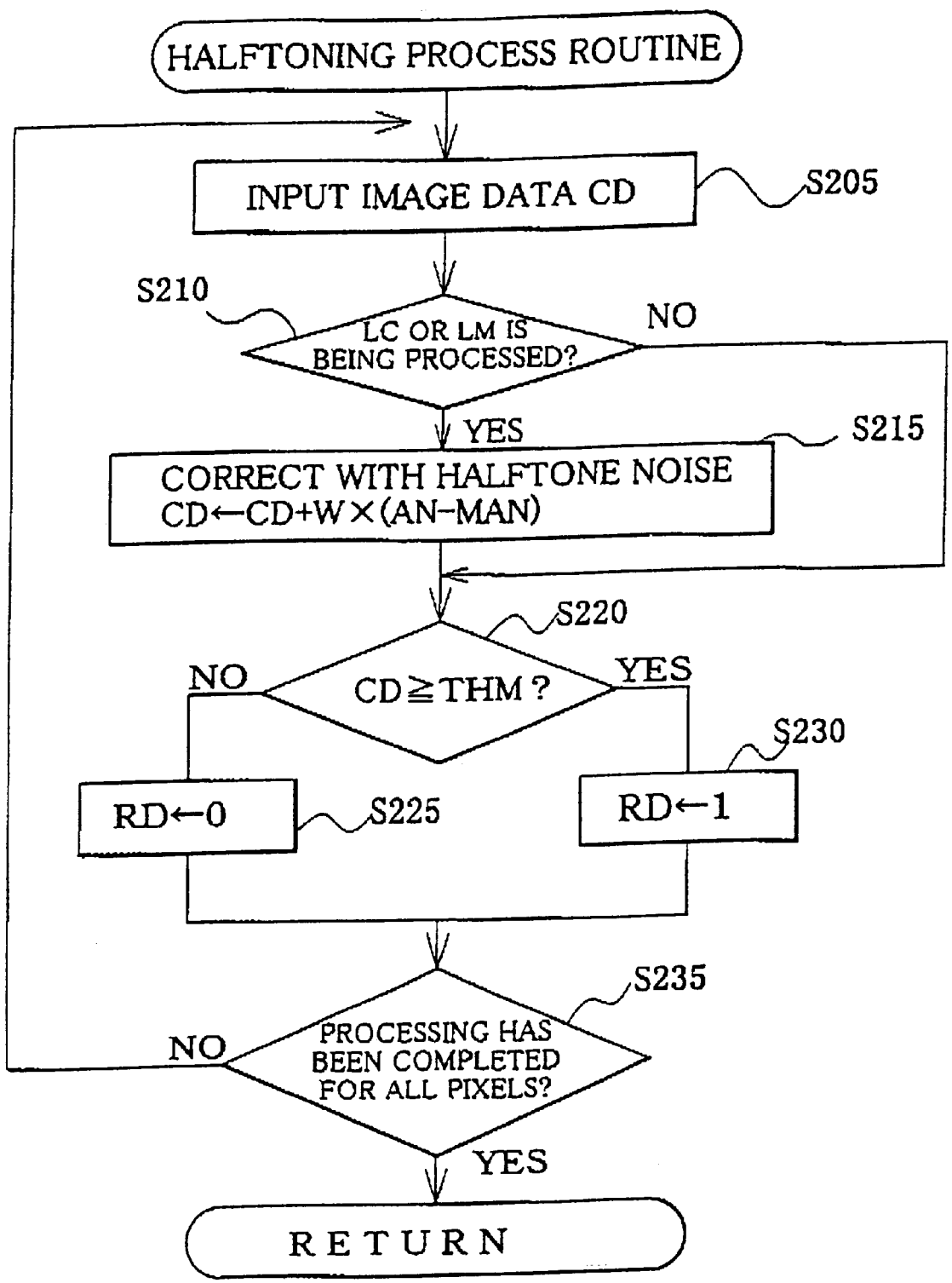
FIG. 15 is a flowchart showing a halftoning process routine executed in the third embodiment.
Figure 17:
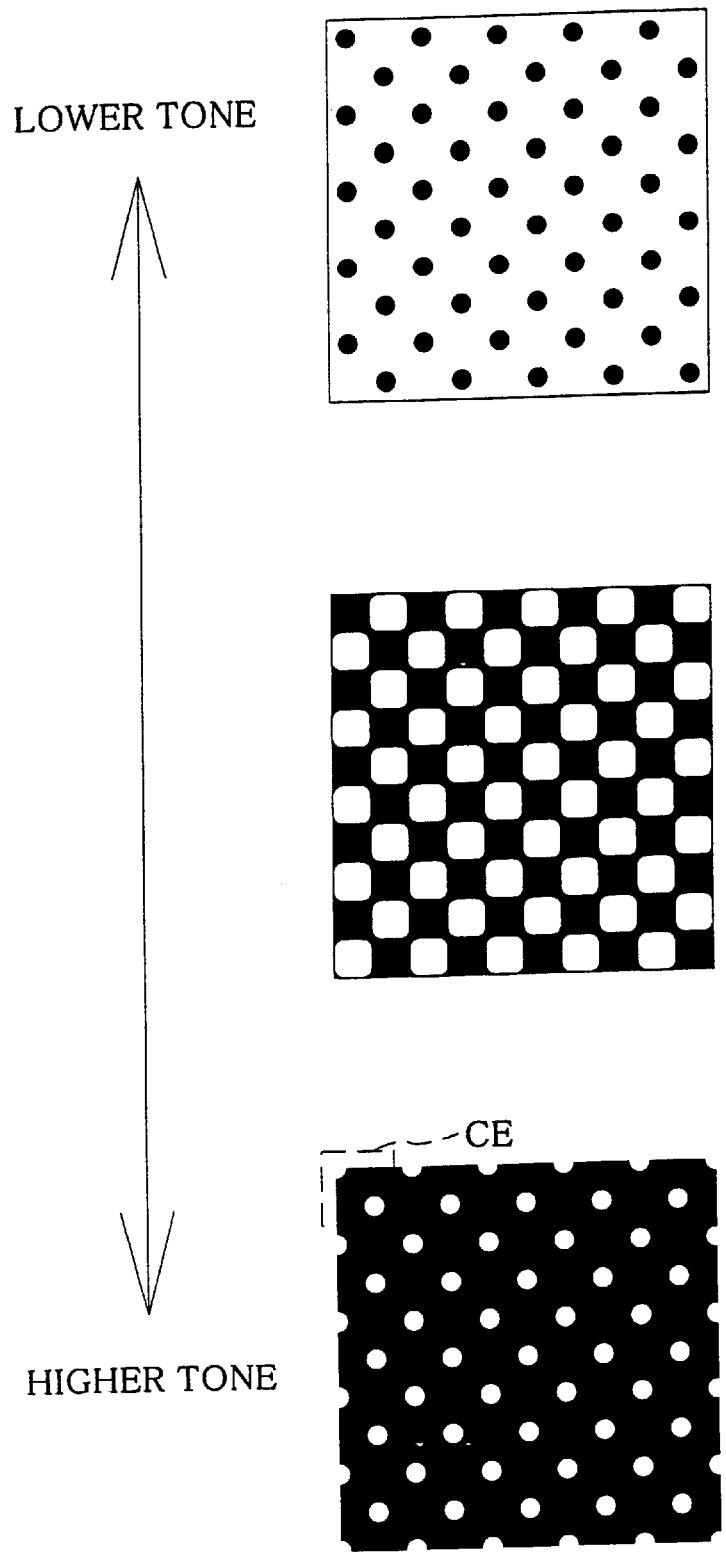
FIG. 17 shows an example of tone expression by the halftoning technique.
Figure 18A:
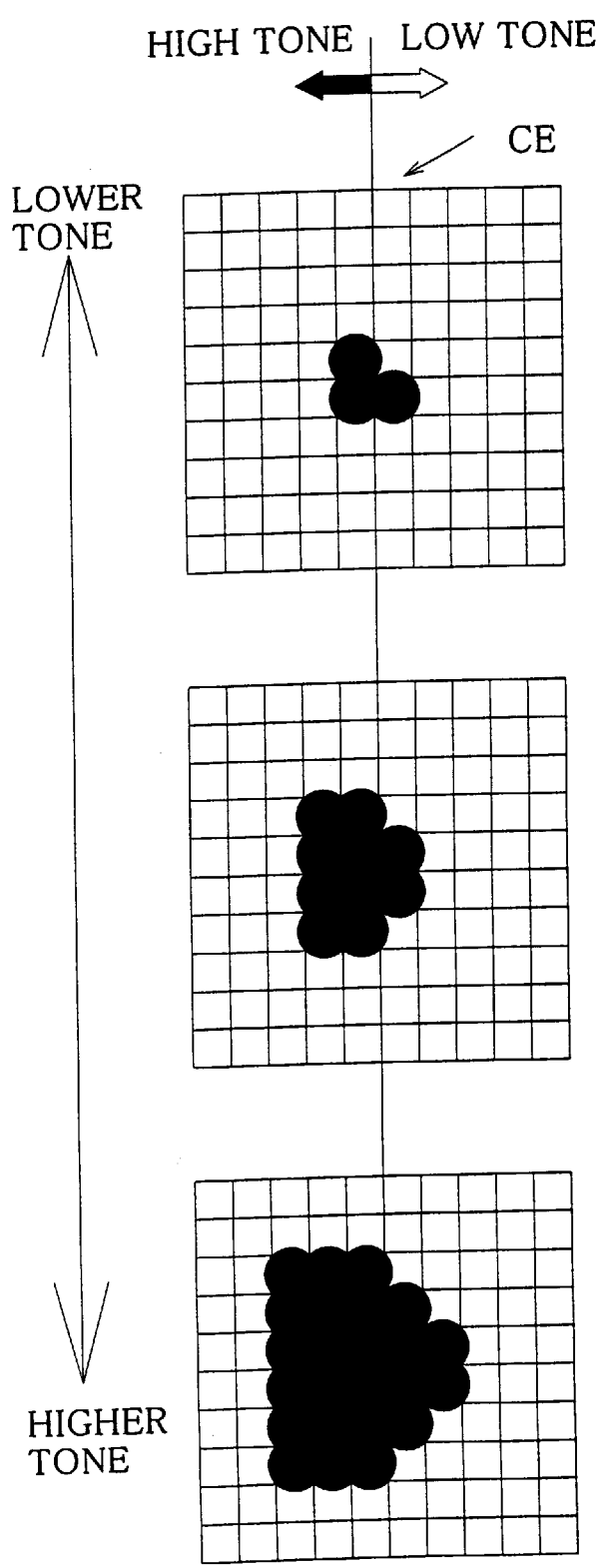
FIG. 18A and FIG. 18B show the state of dots formed by an ink jet printer.
Figure 18B:
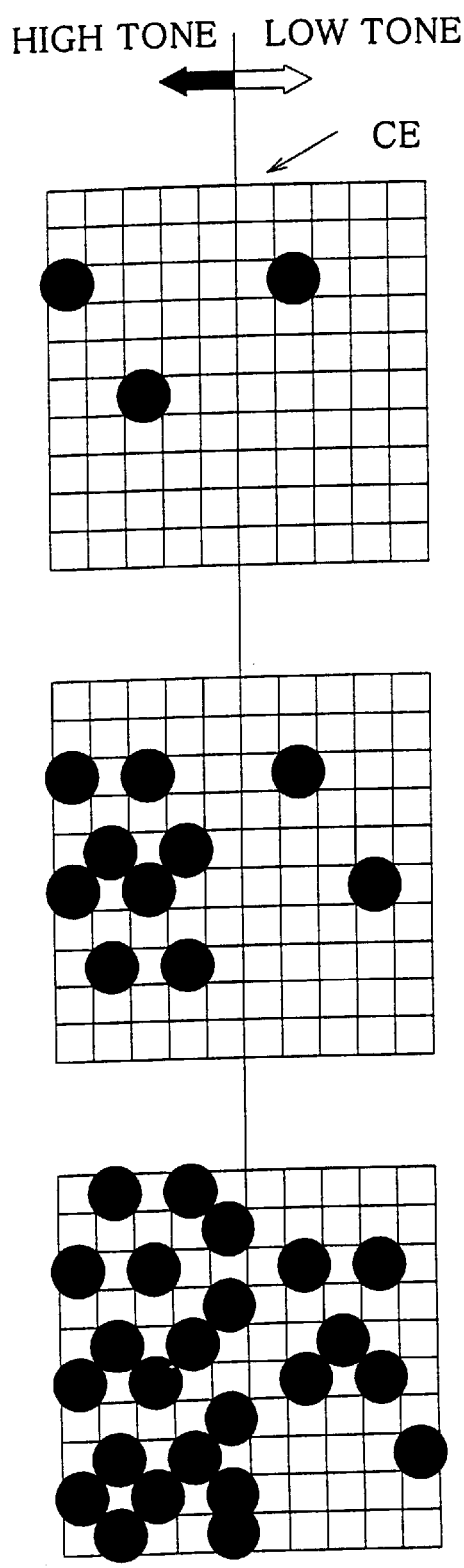

The details of the halftoning process executed in the third embodiment are different from those in the first embodiment. FIG. 15 is a flowchart showing a halftoning process routine executed in the third embodiment. The arrangement of the third embodiment carries out the halftoning process according to the dithering method. The dithering method determines the dot on-off state based on the comparison between the image data and a threshold value stored in a preset dither matrix. FIG. 16 shows the basic idea of determining the dot on-off state according to the dithering method. The dithering method compares the image data CD in each pixel with a threshold value THM stored in the dither matrix, and creates a dot in the pixels where the image data CD is not smaller than the threshold value THM. The hatched pixels in FIG. 16 represent the pixels where a dot is to be created. This series of the processing is described below with the flowchart of FIG. 15. The CPU repeatedly executes the series of the processing shown in the flowchart of FIG. 15 for the respective inks, although the repetition is omitted from the illustration for the purpose of simplicity.

When the program enters the halftoning process routine of the third embodiment, the CPU first receives the image data CD at step S205. The input image data CD here are color-corrected image data as discussed in the first embodiment. The CPU then determines whether or not the currently processed color is either light cyan LC or light magenta LM at step S210. In the case where the currently processed color is either light cyan LC or light magenta LM, the CPU carries out correction with a halftone noise at step S215. The correction follows Equation (1) discussed previously in the first embodiment, and uses the noise data stored in the matrixes shown in FIGS. 9 and 10 as discussed in the first embodiment.

The CPU then compares the image data CD with a threshold value THM at step S220. The threshold value THM set for each pixel is read from the dither matrix. In the case where the image data CD is smaller than the threshold value THM, the CPU determines that no dot is to be created in the pixel and sets a value '0' representing the dot off state to a resulting value RD at step S225. In the case where the image data CD is not smaller than the threshold value THM, on the other hand, the CPU determines that a dot is to be created in the pixel and sets value '0' representing the dot on state to the resulting value RD at step S230. The CPU repeatedly executes the series of the processing discussed above with regard to all the pixels for all the colors at step S235, before exiting from this halftoning process routine.

The arrangement of the third embodiment uses the dot distributed-type dither matrix for the halftoning process. In the dot distributed-type dither matrix used here, the threshold values in the range of 0 to 255 appear without any localization in the area of 64 by 64 dots. A variety of matrixes, for example, the Beiyer-type matrix, may be used for the dot distributed-type dither matrix. A variety of settings are applicable for the size of the dither matrix.

The printing apparatus of the third embodiment carries out the halftoning process that ensures the sufficient dispersibility of dots, thus printing the halftone dot-simulating image with high picture quality. Application of the dithering method for the halftoning process attains the high-speed processing.

The arrangement of the third embodiment carries out the correction with the halftone noises and then the halftoning process according to the dithering method. Like the first and the second embodiments, the halftone noise may be added to the threshold value THM. This is equivalent to the arrangement of carrying out the halftoning process that uses a dither matrix obtained by subtracting the noise data shown in FIG. 9 or FIG. 10 from the dither matrix shown in FIG. 16. The halftoning process may thus be carried out using the dither matrix with reflection of the halftone noises. This procedure omits the step of reflecting the halftone noise on either the image data or the threshold value in the halftoning process routine, thus enhancing the speed of the processing.

The embodiments discussed above add the halftone noises for correction. FIGS. 9 and 10 show examples of such noise data. The technique of the present invention is not restricted to the noise patterns shown in FIGS. 9 and 10, but may be applied to the arrangements using a variety of other noise patterns including local concentration of dots. The arrangement of halftone dots depends upon the number of screen lines and the screen angle. The preset halftone noises may be varied according to these parameters. The noises added for the correction may correspond to a variety of halftone dots selectively used for the required printing effects, for example, halftone dots created in the horizontal direction, halftone dots created in a concentric manner, and halftone dots created in a brick-like pattern, other than those shown in FIGS. 9 and 10. A variety of patterns other than the halftone dot-simulating patterns may be used for the correction. For example, the pattern may include an arrangement of a company logo or another logo, or simulate an image printed on a special printing medium like canvas.

In the embodiments discussed above, the correction with the halftone noises is carried out only for light cyan LC and light magenta LM among the six color inks. These colors have low density and are used in the relatively low tone area. Correction with the halftone noises for these colors enhances the visual recognizability of the halftone dot-simulating pattern. The correction with the noises is, however, not restricted to these colors, but may be carried out for other colors or for all the colors. The embodiments regard the printing apparatus using the six different color inks. The technique of the present invention is, however, applicable to printers using only four color inks, cyan, magenta, yellow, and black as well as to monochromatic printing.

The embodiments discussed above regard the applications to the ink jet printer. The technique of the present invention is applicable to a diversity of printers that create dots and print an image. The present invention may be attained by an image processing apparatus that carries out the halftoning process to generate halftone data. The halftone data may be supplied to not only the printer but a display unit that displays images with dots.

The present invention is not restricted to the above embodiments or their modifications, but there may be many other modifications, changes, and alterations without departing from the scope or spirit of the main characteristics of the present invention. For example, the series of control processes described in the embodiments may partly or wholly be attained by a hardware configuration.

The scope and spirit of the present invention are limited only by the terms of the appended claims.

What is claimed is:

1. An image processing apparatus that generates halftone data, which specifies a dot creating state in each pixel, from image data having tone values in a predetermined range, said image processing apparatus comprising:
   an input unit that inputs the image data; and
   a halftoning unit that carries out a dot distributed-type halftoning process to generate the halftone data,
   said halftoning unit comprising:
      a pattern storage unit that stores noise data according to a predetermined pattern, which includes local concentration of dots; and
      a reflection unit that causes the noise data stored in the predetermined pattern to be reflected on at least one of the image data and predetermined threshold value data to be used in the dot distribution-type halftoning process prior to the dot distribution-type halftoning process.

2. An image processing apparatus in accordance with claim 1, wherein the predetermined pattern is a halftone dot-simulating pattern.

3. An image processing apparatus in accordance with claim 2, wherein the image data is multi-color image data, and
   said reflection unit causes the predetermined pattern, which is a halftone dot-simulating pattern having different screen angles between at least part of colors, to be reflected on the halftoning process.

4. An image processing apparatus in accordance with claim 3, wherein the at least part of colors comprise cyan and magenta.

5. An image processing apparatus in accordance with claim 1, wherein said halftoning unit carries out the halftoning process according to technique of error diffusion.

6. An image processing apparatus in accordance with claim 1, wherein said halftoning unit carries out the halftoning process according to technique of dither.

7. An image processing apparatus that generates halftone data, which specifies a dot creating state in each pixel, from image data having tone values in a predetermined range, said image processing apparatus comprising:
   an input unit that inputs the image data; and
   a halftoning unit that carries out a dot distributed-type halftoning process to generate the halftone data, the dot creating state provides a plurality of different types of dots having at least one of different hues and different reflective densities of creation,
   said halftoning unit comprising:
      a pattern storage unit that stores noise data according to a predetermined pattern, which includes local concentration of dots; and
      a reflection unit that causes the noise data stored in the predetermined pattern to be reflected on the halftoning process for each type of dots with regard to part of the dots.

8. An image processing apparatus in accordance with claim 7, wherein the dots include a plurality of different types of dots having an identical hue but different reflective densities of creation, and
   the part of the dots excludes at least a specific type of dots having the identical hue and a higher reflective density among the plurality of different types of dots.

9. An image processing apparatus in accordance with claim 8, wherein the dots include a plurality of different types of dots having different hues including yellow, and
   the part of the dots has a hue excluding at least yellow.

10. An image processing apparatus in accordance with claim 8, wherein the dots include a plurality of different types of dots having different hues including yellow, cyan, and magenta, and
    the part of the dots includes cyan dots and magenta dots.

11. A printing apparatus that creates dots to print an image on a printing medium, said printing apparatus comprising:
    an input unit that inputs image data having tone values in a predetermined range
    a halftoning unit that carries out a dot distributed-type halftoning process to generate halftone data, which specifies a dot creating state in each pixel; and
    a dot creation unit that creates dots on said printing medium based on the halftone data,
    said halftoning unit comprising:
       a pattern storage unit that stores noise data according to a predetermined pattern, which includes local concentration of dots; and
       a reflection unit that causes the noise data stored in the predetermined pattern to be reflected on at least one of the image data and predetermined threshold value data to be used in the dot distribution-type halftoning process prior to the dot distributed-type halftoning process.

12. An image processing method that generates halftone data, which specifies a dot creating state in each pixel, from image data having tone values in a predetermined range, said method comprising the steps of:
    (a) inputting the image data; and
    (b) carrying out a dot distributed-type halftoning process, on which noise data preset according to a predetermined pattern including local concentration of dots are reflected on at least one of the image data and predetermined threshold value data to be used in the dot distribution-type prior to the dot distributed-type halftoning process, so as to generate the halftone data.

13. A recording medium in which a specific program is recorded in a computer readable manner, said specific program generating halftone data, which specifies a dot creating state in each pixel, from image data having tone values in a predetermined range,
    said specific program comprising noise data preset according to a predetermined pattern including local concentration of dots, said specific program causing a computer to attain the functions of:

causing the noise data to be reflected on at least the input image data or a predetermined threshold value; and carrying out a dot distributed-type halftoning process to generate the halftone data from the image data and the threshold value after the reflection.

* * * * *